(12) United States Patent
Priyanto et al.

(10) Patent No.: US 11,973,559 B2
(45) Date of Patent: Apr. 30, 2024

(54) RETRANSMISSION OF RANDOM ACCESS MESSAGE BASED ON CONTROL MESSAGE FROM A BASE STATION

(71) Applicant: Sony Corporation, Tokyo (JP)

(72) Inventors: Basuki Priyanto, Lund (SE); Rickard Ljung, Helsingborg (SE); Shin Horng Wong, Weybridge (GB); Martin Beale, Weybridge (GB)

(73) Assignee: Sony Corporation, Tokyo (JP)

( * ) Notice: Subject to any disclaimer, the term of this patent is extended or adjusted under 35 U.S.C. 154(b) by 375 days.

(21) Appl. No.: 16/637,743

(22) PCT Filed: Aug. 10, 2018

(86) PCT No.: PCT/EP2018/071788
§ 371 (c)(1),
(2) Date: Feb. 8, 2020

(87) PCT Pub. No.: WO2019/030390
PCT Pub. Date: Feb. 14, 2019

(65) Prior Publication Data
US 2020/0212987 A1 Jul. 2, 2020

(30) Foreign Application Priority Data
Aug. 11, 2017 (SE) .................... 1730210-0

(51) Int. Cl.
*H04B 7/06* (2006.01)
*H04B 7/0408* (2017.01)
(Continued)

(52) U.S. Cl.
CPC ......... *H04B 7/0695* (2013.01); *H04B 7/0408* (2013.01); *H04B 7/0617* (2013.01);
(Continued)

(58) Field of Classification Search
CPC .. H04B 7/0695; H04B 7/0408; H04B 7/0617; H04B 7/0404; H04B 7/0691;
(Continued)

(56) References Cited

U.S. PATENT DOCUMENTS

2010/0172299 A1* 7/2010 Fischer ............. H04W 74/0866
370/328
2012/0149422 A1* 6/2012 Ye ........................ H04W 52/50
455/522

(Continued)

FOREIGN PATENT DOCUMENTS

CN 102594532 A 7/2012
CN 104205670 B 12/2017
(Continued)

OTHER PUBLICATIONS

"Power ramping procedure for multi-beam case", 3GPP TSG RAN WG1 Meeting #89 (R1-1708368), Hangzhou, P.R. China May 15-19, 2017 (Year: 2017).*

(Continued)

*Primary Examiner* — Ian N Moore
*Assistant Examiner* — Sun Jong Kim
(74) *Attorney, Agent, or Firm* — Tucker Ellis LLP

(57) ABSTRACT

A method of operating a communication device (102) comprises: receiving, from a base station (101) of a wireless network (100), a control message indicative of at least one retransmission parameter for a random access message (6001) which comprises random access preamble; and transmitting, on a plurality of beams (310-313) selected in accordance with the at least one retransmission parameter, a plurality of retransmissions (701) of the random access message (6001).

19 Claims, 12 Drawing Sheets

(51) Int. Cl.
　　*H04L 1/1867*　　(2023.01)
　　*H04W 24/10*　　(2009.01)
　　*H04W 52/36*　　(2009.01)
　　*H04W 74/08*　　(2009.01)
　　*H04W 74/0833*　　(2024.01)

(52) U.S. Cl.
　　CPC ............ *H04L 1/189* (2013.01); *H04L 1/1896* (2013.01); *H04W 24/10* (2013.01); *H04W 52/362* (2013.01); *H04W 74/0833* (2013.01)

(58) Field of Classification Search
　　CPC ..... H04L 1/189; H04L 1/1896; H04L 1/0001; H04W 24/10; H04W 52/362; H04W 74/0833; H04W 52/42; H04W 52/48; H04W 52/241; H04W 52/246; H04W 52/146; H04W 52/228; H04W 52/50
　　See application file for complete search history.

(56) References Cited

U.S. PATENT DOCUMENTS

| | | | |
|---|---|---|---|
| 2013/0114401 A1* | 5/2013 | Martin .................. | H04W 28/04 370/225 |
| 2013/0329631 A1* | 12/2013 | Alam .................... | H04W 52/50 370/328 |
| 2014/0376466 A1 | 12/2014 | Jeong et al. | |
| 2016/0165623 A1* | 6/2016 | Pan ....................... | H04W 72/54 370/336 |
| 2017/0251460 A1* | 8/2017 | Agiwal ................ | H04B 7/0617 |
| 2018/0070380 A1 | 3/2018 | Nagaraja et al. | |
| 2018/0254859 A1* | 9/2018 | Islam ................ | H04W 72/0446 |
| 2020/0107275 A1* | 4/2020 | Cho .................. | H04W 74/0833 |
| 2021/0127425 A1* | 4/2021 | Park ..................... | H04B 7/0695 |
| 2021/0212123 A1* | 7/2021 | Reial ..................... | H04W 72/08 |

FOREIGN PATENT DOCUMENTS

| | | |
|---|---|---|
| EP | 2887558 A1 | 6/2015 |
| EP | 3273612 A1 | 1/2018 |
| WO | 2016086144 A1 | 6/2016 |

OTHER PUBLICATIONS

U.S. Appl. No. 62/524,793, filed Jun. 26, 2017 (Year: 2017).*
U.S. Appl. No. 62/520,864, filed Jun. 16, 2017 (Year: 2017).*
U.S. Appl. No. 62/470,889, filed Mar. 14, 2017 (Year: 2017).*
International Search Report and Written Opinion from corresponding PCT/EP2018/071788, dated Oct. 10, 2018, 12 pages.
Sharp, "Power ramping procedure for multi-beam case", 3GPP, R1-1708368, May 4, 2017, 6 pages.
Huawei et al., "Impact of Multi-beam operations to Power Ramping for RACH", 3GPP, R2-1706462, Jun. 26, 2017, 3 pages.
Qualcomm Incorporated, "Power Ramping and Power Control for RACH Procedure", 3GPP, R1-1711147, Jun. 26, 2017, 3 pages.
LG Electronics, et al., "WF on RACH Power Control", 3GPP TSG RAN WG1 Meeting RAN1 Adhoc R1-1711828, Jun. 27, 2017, 4 pages.
Swedish Search Report from corresponding Swedish Application No. 1730210-0, dated Mar. 27, 2018, 8 pages.
3GPP R1-166417: "Overview of NR Initial Access"; ZTE; 3rd Generation Partnership Project; dated Aug. 13, 2016, 6 pages.
3GPP R1-1707937; "Considerations on contention-free random access", Samsung, May 6, 2017, 3rd Generation Partnership Project (3GPP), dated May 6, 2017; 6 pages.
Chinese Office Action dated Aug. 12, 2022 for Application Serial No. 2018800611177 (15 Pages).
Sharp, "Power Ramping Procedure for Multi-Beam Case." 3GPP TSG RAN WG1 Meeting #89, Hangzhou, P.R. China, May 15-19, 2017 (6 pages).
Chinese Search Report dated Aug. 5, 2022 for Application Serial No. 2018800611177 (1 page).

* cited by examiner

RETRANSMISSION OF RANDOM ACCESS MESSAGE BASED ON CONTROL MESSAGE FROM A BASE STATION

TECHNICAL FIELD

Various examples of the invention generally relate to transmitting a plurality of retransmissions of a random access message. Various examples specifically relate to transmitting the plurality of retransmissions on a plurality of beams selected in accordance with at least one retransmission parameter.

BACKGROUND

A device/terminal (UE) configured to wirelessly communicate with a base station (BS) of a network may be in a disconnected state or idle state or initial state. Then, for connecting to the network, the UE may transition into a connected state by performing a random-access procedure. Triggers for performing the random-access (RA) procedure may include uplink (UL) data scheduled for transmission and/or receipt of a downlink paging indicative of downlink data scheduled for transmission and/or downlink (DL) data schedule for transmission.

For the RA procedure, the UE may periodically listen to information blocks broadcasted by one or more BSs of the network. For example, the broadcasted information blocks may include such information as a cell identity of the broadcasting BS. Based on the broadcasted information, the UE may then transmit a randomly selected RA preamble to the BS, in a respective RA message 1 (RA Msg. 1). In response to transmitting the preamble, the UE may receive a RA response (RAR) message (also known as RA Msg.2) including a grant for UL resources on which the UE can send a higher-layer connection request. For example, in the context of the Third Generation Partnership Project (3GPP) Long Term Evolution (LTE) protocol, the connection request may relate to the Radio Resource Control (RRC) layer of the transmission protocol stack, i.e., Layer 3 according to the Open System Interface (OSI) model. Details of the RA procedure according to 3GPP LTE are described in 3GPP Technical Specification (TS) 36.211, 36.231, 36.321, and 36.331.

Reference implementations of RA procedures face certain restrictions and drawbacks. For example, sometimes, the RA message including the RA preamble may not be received successfully by the BS. Then, under the condition that the RA preamble is not received successfully, one or more retransmissions of the RA message may be performed. According to the 3GPP LTE framework, the transmission power level may be increased, see 3GPP TS 36.321, V. 14.0.0, section 5.1. According to reference implementations, such retransmission may occupy the spectrum, because a considerable number of retransmissions may be required until successful delivery of the RA message.

Draft Report of 3GPP TSG RAN WG1 #89 v0.2.0, Section 7.1.1.4.2 on page 78 discloses that a counter of transmission power level ramping remains unchanged if the UE performs beam switching. 3GPP TSG RAN WG1 Meeting RAN1 Adhoc, Contribution R1-1711861 describes an approach for implementing retransmission of RA message using beam switching and power ramping. Such a techniques is limited in the flexibility of the retransmission of the RA message. Latency and/or interference may be significant.

SUMMARY

Therefore, a need exists for advanced RA procedures. In particular, a need exists for such techniques which overcome or mitigate at least some of the above-identified restrictions and drawbacks.

This need is met by the features of the independent claims. The features of the dependent claims define embodiments.

A method of operating a communication device includes receiving, from a base station of a wireless network, a control message indicative of at least one retransmission parameter for a RA message which includes a RA preamble. The method further includes transmitting, on a plurality of beams selected in accordance with the at least one retransmission parameter, a plurality of retransmissions of the RA message.

As a general rule, said transmitting of a successive one of the plurality of retransmissions can be conditional on unsuccessful reception of a preceding one of the plurality of retransmissions.

A method of operating a communication device includes receiving, from a base station of a wireless network, a control message indicative of at least one retransmission parameter for a RA message which includes a RA preamble. The at least one retransmission parameter may be associated with a plurality of beams. The method further includes transmitting, on the plurality of beams selected in accordance with the at least one retransmission parameter, a plurality of retransmissions of the RA message.

A computer program product includes program code. The program code may be executed by at least one processor. Executing the program code causes the at least one processor to perform a method of operating a communication device. The method includes receiving, from a base station of a wireless network, a control message indicative of at least one retransmission parameter for a RA message which includes a RA preamble. The method further includes transmitting, on a plurality of beams selected in accordance with the at least one retransmission parameter, a plurality of retransmissions of the RA message.

A computer program includes program code. The program code may be executed by at least one processor. Executing the program code causes the at least one processor to perform a method of operating a communication device. The method includes receiving, from a base station of a wireless network, a control message indicative of at least one retransmission parameter for a RA message which includes a RA preamble. The method further includes transmitting, on a plurality of beams selected in accordance with the at least one retransmission parameter, a plurality of retransmissions of the RA message.

A method of operating a communication device includes receiving, from a base station of a wireless network, a control message indicative of at least one retransmission parameter for a RA message which includes a RA preamble. The method further includes transmitting, on a plurality of beams selected in accordance with the at least one retransmission parameter and/or on a plurality of transmission power levels selected in accordance with the at least one retransmission parameter, a plurality of retransmissions of the RA message.

A computer program product includes program code. The program code may be executed by at least one processor. Executing the program code causes the at least one processor to perform a method of operating a communication device. The method includes receiving, from a base station of a wireless network, a control message indicative of at least one retransmission parameter for a RA message which includes a RA preamble. The method further includes transmitting, on a plurality of beams selected in accordance with the at least one retransmission parameter and/or on a plurality of transmission power levels selected in accordance with the at least one retransmission parameter, a plurality of retransmissions of the RA message.

A computer program includes program code. The program code may be executed by at least one processor. Executing the program code causes the at least one processor to perform a method of operating a communication device. The method includes receiving, from a base station of a wireless network, a control message indicative of at least one retransmission parameter for a RA message which includes a RA preamble. The method further includes transmitting, on a plurality of beams selected in accordance with the at least one retransmission parameter and/or on a plurality of transmission power levels selected in accordance with the at least one retransmission parameter, a plurality of retransmissions of the RA message.

A communication device including control circuitry configured to perform: receiving, from a base station of a wireless network, a control message indicative of at least one retransmission parameter for a RA message which includes a RA preamble; and transmitting, on a plurality of beams selected in accordance with the at least one retransmission parameter, a plurality of retransmissions of the RA message.

A method of operating a base station of a wireless network includes transmitting, to a communication device, a control message indicative of at least one retransmission parameter for a RA message. The RA message includes a RA preamble. The at least one retransmission parameter is associated with a plurality of beams. The method further includes receiving, on at least one beam of the plurality of beams, at least one retransmission of the RA message.

A computer program product includes program code. The program code may be executed by at least one processor. Executing the program code causes the at least one processor to perform a method of operating a base station of a wireless network. The method includes transmitting, to a communication device, a control message indicative of at least one retransmission parameter for a RA message. The RA message includes a RA preamble. The at least one retransmission parameter is associated with a plurality of beams. The method further includes receiving, on at least one beam of the plurality of beams, at least one retransmission of the RA message.

A computer program includes program code. The program code may be executed by at least one processor. Executing the program code causes the at least one processor to perform a method of operating a base station of a wireless network. The method includes transmitting, to a communication device, a control message indicative of at least one retransmission parameter for a RA message. The RA message includes a RA preamble. The at least one retransmission parameter is associated with a plurality of beams. The method further includes receiving, on at least one beam of the plurality of beams, at least one retransmission of the RA message.

A method of operating a base station of a wireless network includes transmitting, to a communication device, a control message indicative of at least one retransmission parameter for a RA message. The RA message includes a RA preamble. The method further includes receiving, on at least one beam of a plurality of beams, at least one retransmission of the RA message. The at least one beam of the plurality of beams is selected in accordance with the at least one retransmission parameter.

A computer program product includes program code. The program code may be executed by at least one processor. Executing the program code causes the at least one processor to perform a method of operating a base station of a wireless network. The method includes transmitting, to a communication device, a control message indicative of at least one retransmission parameter for a RA message. The RA message includes a RA preamble. The method further includes receiving, on at least one beam of a plurality of beams, at least one retransmission of the RA message. The at least one beam of the plurality of beams is selected in accordance with the at least one retransmission parameter.

A computer program includes program code. The program code may be executed by at least one processor. Executing the program code causes the at least one processor to perform a method of operating a base station of a wireless network. The method includes transmitting, to a communication device, a control message indicative of at least one retransmission parameter for a RA message. The RA message includes a RA preamble. The method further includes receiving, on at least one beam of a plurality of beams, at least one retransmission of the RA message. The at least one beam of the plurality of beams is selected in accordance with the at least one retransmission parameter.

A base station includes control circuitry configured to perform transmitting, to a communication device, a control message indicative of at least one retransmission parameter for a RA message which includes a RA preamble, the at least one retransmission parameter being associated with a plurality of beams; receiving, on at least one beam of the plurality of beams, at least one retransmission of the RA message.

A system includes a communication device and a base station. The communication device includes first control circuitry. The base station includes second control circuitry. The second control circuitry is configured to transmit, to the communication device, a control message. The first control circuitry is configured to receive, from the base station, the control message. The control message is indicative of at least one retransmission parameter for a RA message which includes a RA preamble. The first control circuitry is configured to transmit, on a plurality of beams selected in accordance with the at least one retransmission parameter, a plurality of retransmissions of the RA message. The second control circuitry is configured to receive, on at least one beam of the plurality of beams, at least one retransmission of the RA message.

It is to be understood that the features mentioned above and those yet to be explained below may be used not only in the respective combinations indicated, but also in other combinations or in isolation without departing from the scope of the invention.

BRIEF DESCRIPTIONS OF THE DRAWINGS

FIG. 1 schematically illustrates a BS and a UE communicating on a wireless link according to various examples.

FIG. 2 schematically illustrates the BS and the UE communicating on a plurality of propagation channels according to various examples.

FIG. 3 schematically illustrates a cellular network according to the 3GPP LTE architecture and according to various examples.

Figure 6:
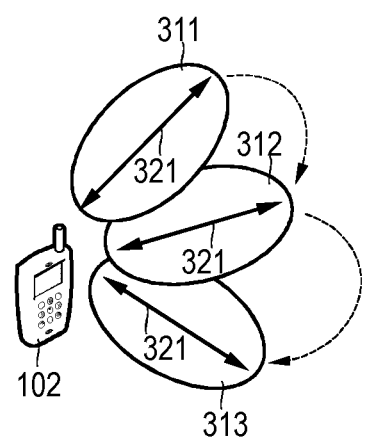

FIG. 6 schematically illustrates a UE transmitting on a plurality of beams according to various examples.

Figure 7:
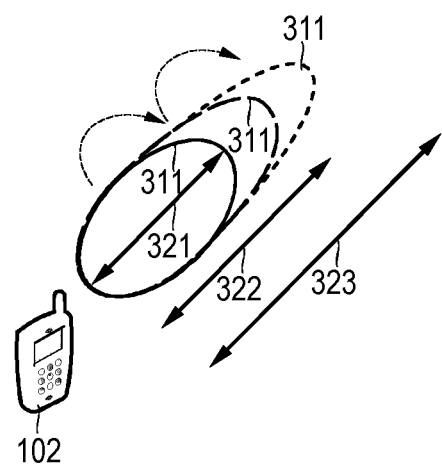

FIG. 7 schematically illustrates a UE transmitting at a plurality of transmission power levels according to various examples.

Figure 8:
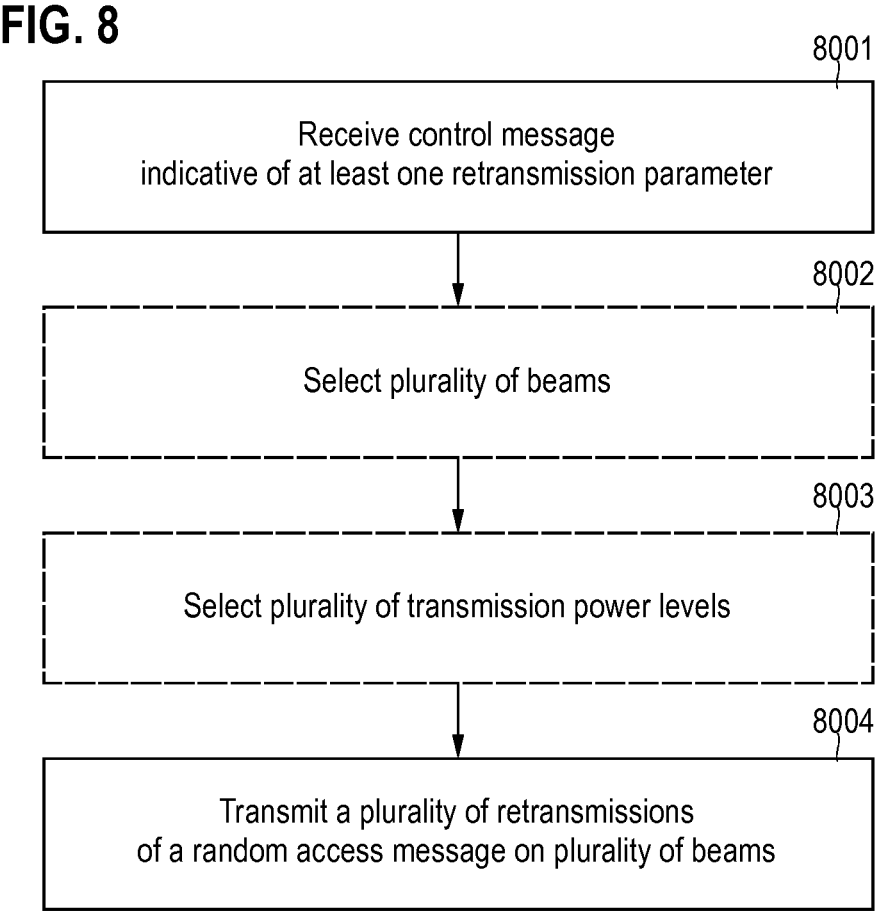

FIG. 8 is a flowchart of a method according to various examples.

Figure 9:
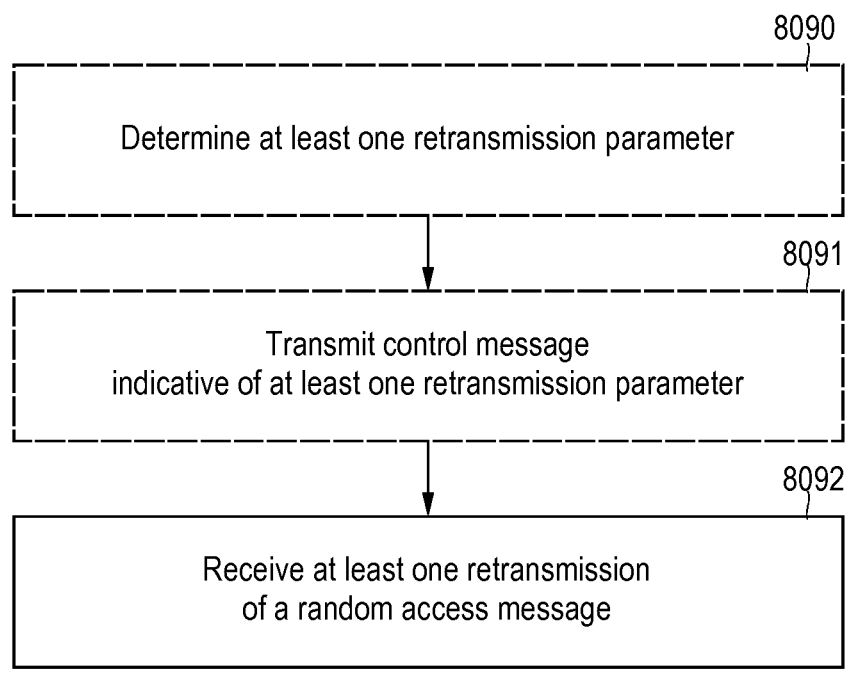

FIG. 9 is a flowchart of a method according to various examples.

Figure 10:
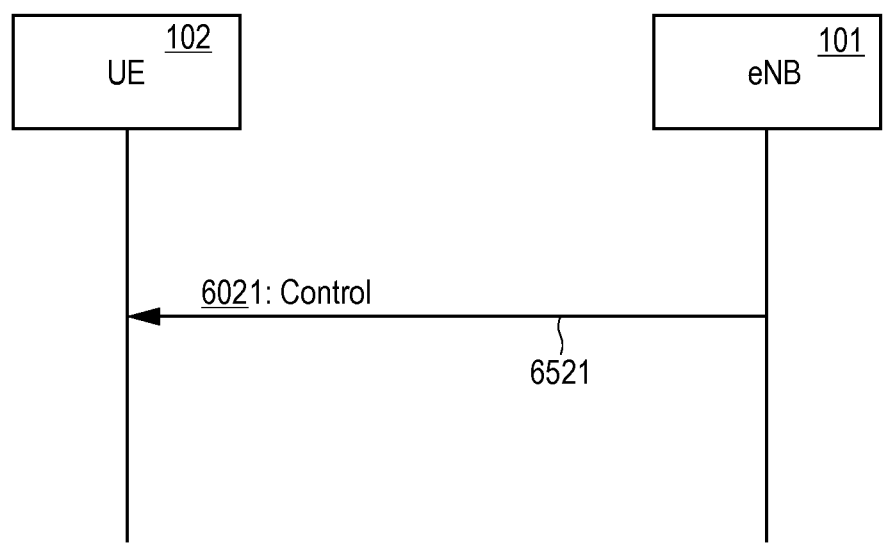

FIG. 10 is a signaling diagram of configuring at least one retransmission parameter of a RA procedure according to various examples.

Figure 11:
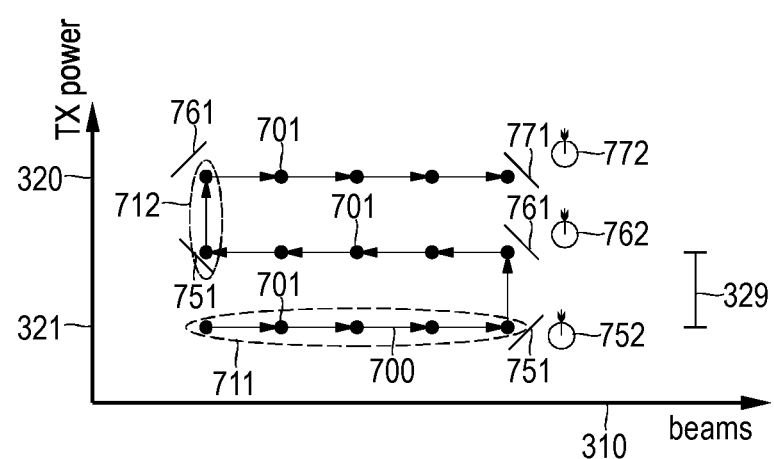

FIG. 11 schematically illustrates a retransmission strategy of retransmitting a RA message according to various examples.

Figure 12:
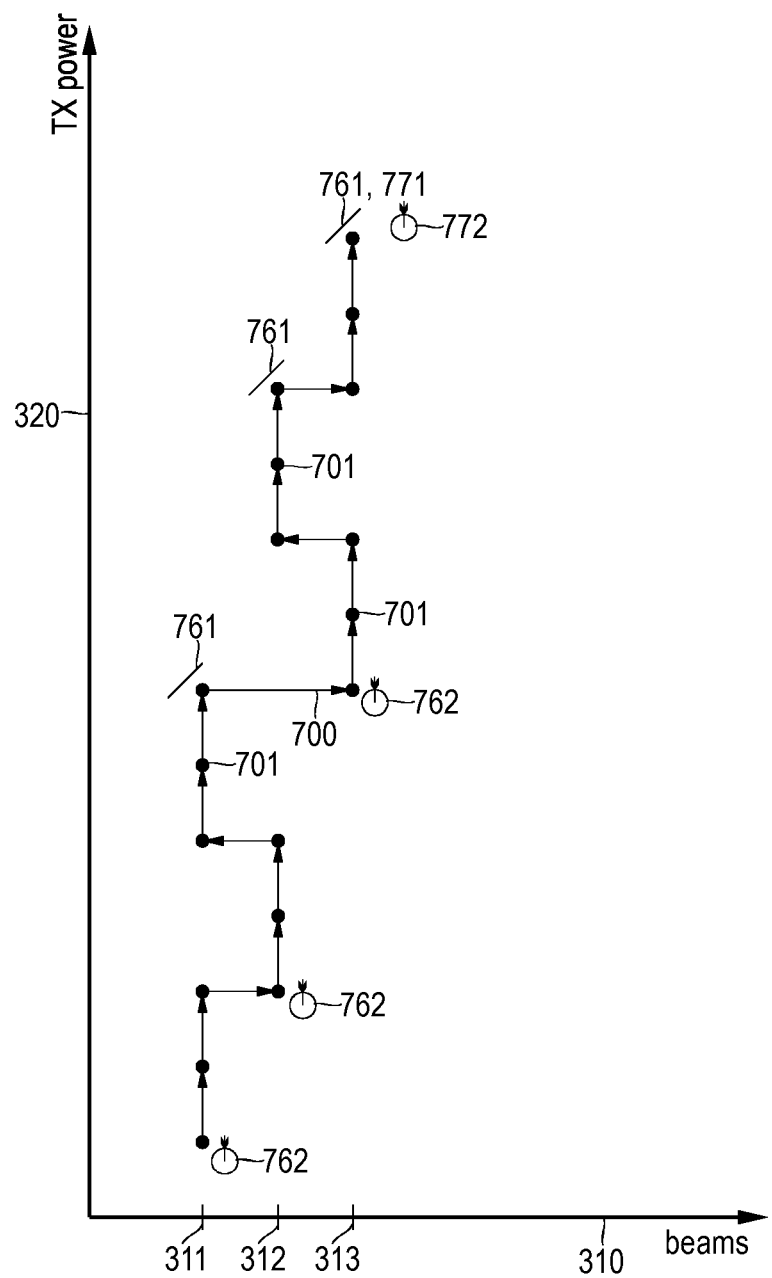

FIG. 12 schematically illustrates a retransmission strategy of retransmitting a RA message according to various examples.

Figure 13:
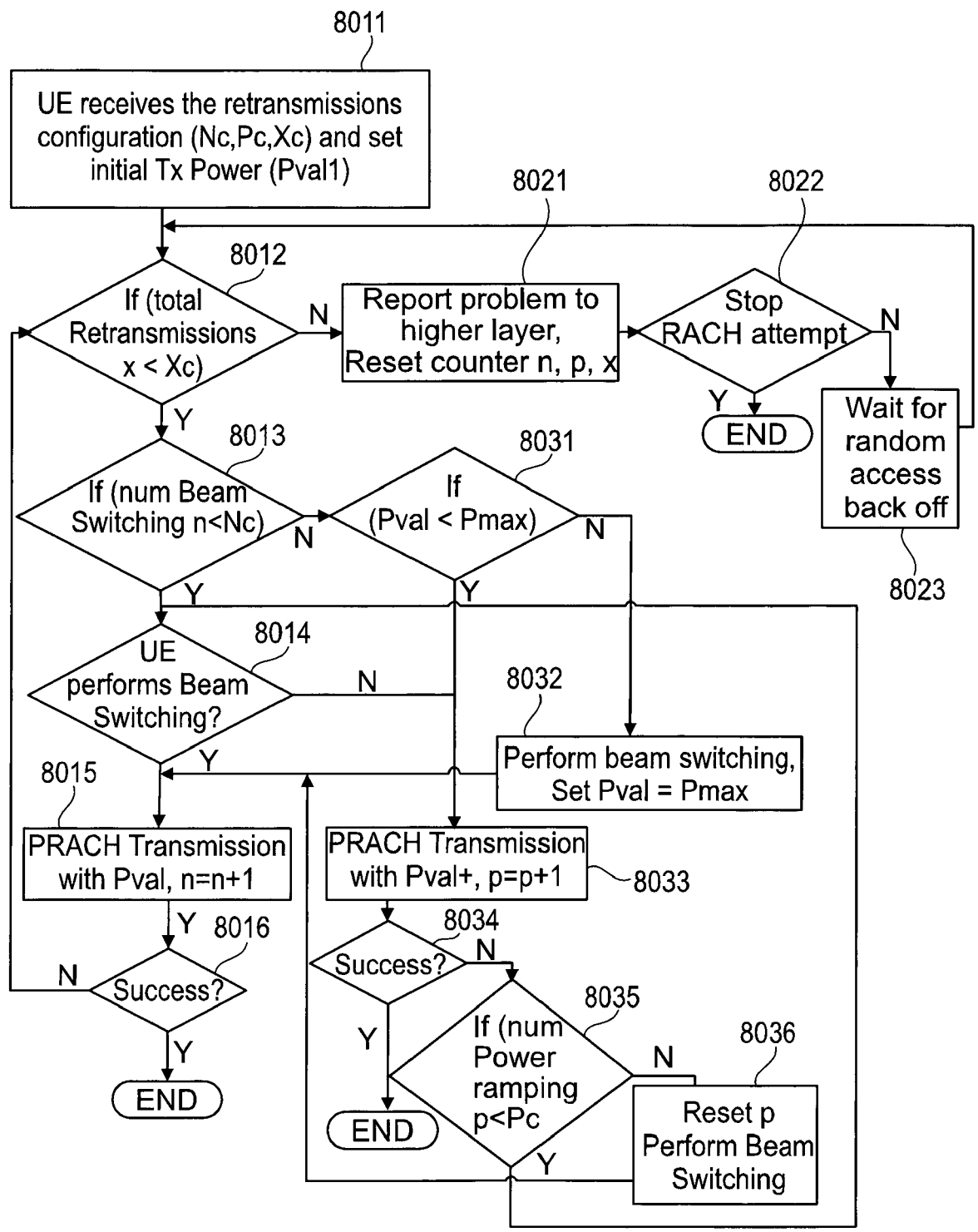

FIG. 13 is a flowchart of a method according to various examples.

Figure 14:
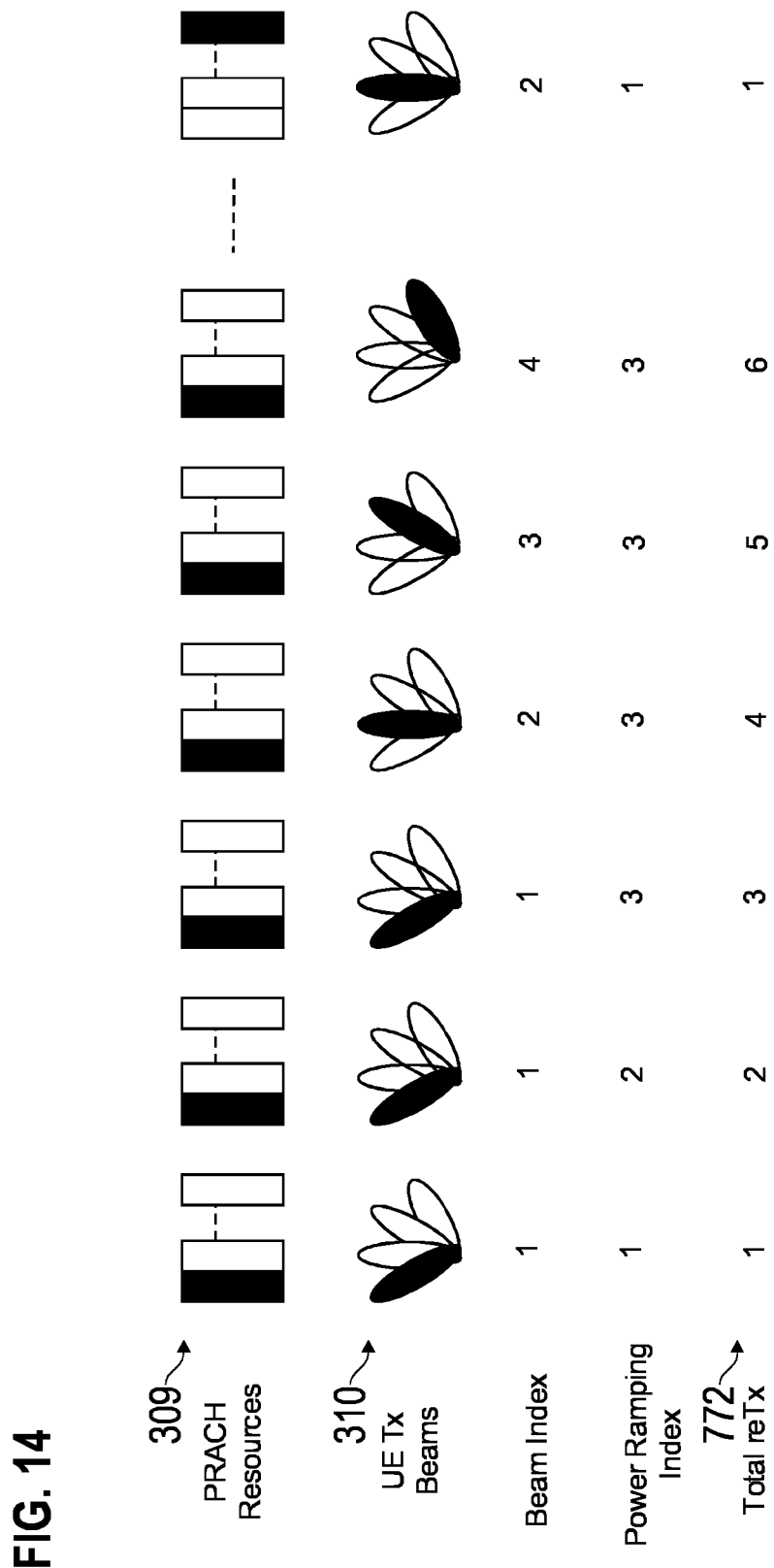

FIG. 14 schematically illustrates a retransmission strategy of retransmitting a RA message according to various examples.

DETAILED DESCRIPTION OF EMBODIMENTS

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques related to a RA procedure of a UE connecting to a network are described. For example, the network may be a cellular network including multiple cells, wherein each cell is defined by one or more BSs. Example network architectures include the 3GPP Long Term Evolution (LTE) or New Radio (NR) architecture. For example, the 3GPP LTE and NR protocols employ a RA procedure including 4 messages exchanged between the UE and the BS (4-step RA procedure). However, other RA procedures that may be used in connection with the presently described examples may implement fewer messages, e.g., two messages exchanged between UE and the BS. See, e.g., 3GPP TSG-RAN1 Meeting #86bis R1-1610992, "LS on NR RA Procedure" (2-step RA procedure).

According to various examples, retransmission strategies for transmitting multiple retransmissions of a RA message including the RA preamble are described. According to such retransmission strategies, one or more transmission characteristics may be changed over the course of the plurality of retransmissions. For example, it would be possible that the plurality of retransmissions of the RA message are transmitted on a plurality of beams (beam switching, sometimes also referred to as beam sweep). Alternatively or additionally, it would be possible that the plurality of retransmissions of the RA message are transmitted at a plurality of transmission power levels (power ramping).

A beam may relate to a spatial transmission profile; there may be an anisotropy of the signal strength in the surrounding of the UE. A beam may have a certain beam width which corresponds to the opening angle into which electromagnetic waves are emitted. For example, a so-called pencil beam may have a comparably small beam width, e.g., in the range of 10°-90°. In other examples, beams having larger beam width can be employed. Transmitting messages on certain beams having a finite beam width can be achieved using techniques of beamforming. Beamforming may rely on antenna arrays; here, the antennas form a phased array, i.e., different antennas emit electromagnetic waves at a well-defined amplitude and phase relationship. The amplitudes and phases with which different antennas of the antenna array contribute to transmission on a beam are sometimes referred to as antenna weights or steering vectors. A beam may in some implementations be switched or changed by reconfiguring amplitude and phase relationship while using the same antennas for the transmission before and after the switching. A beam may in some implementations be switched by changing (activating or deactivating) selected antennas that are used for a transmission. Hence, a beam switch may include that one or more different antennas are being used before and after the switching. A beam may also be based on analog beamforming, digital beamforming, or hybrid beamforming.

Transmitting multiple retransmissions of the RA message on a plurality of beams may, in particular, have certain advantageous effects when employed for 3GPP NR radio access networks. Here, often comparably high frequencies—e.g., at 6 GHz and beyond—are used for transmission. Then, it can be difficult to obtain beams having a comparably large beam width. This helps to increase transmission reliability.

Various techniques are based on the finding that using a high transmission power level for transmitting the RA message may, on the one hand side, increase the probability of successful reception of that message. On the other hand, using a high transmission power level can also create significant interference—in particular of the beam is pointed into the wrong direction. Therefore, transmitting multiple retransmissions of the RA message on the plurality of beams can also increase the probability of successful transmission, in particular for scenarios where the UE is not well aware of the particular direction in which the BS is arranged. Nonetheless, using a plurality of beams for transmitting the multiple retransmissions of the RA message can also increase the interference, e.g., if a retransmission of the RA message is transmitted in the wrong direction.

Therefore, various techniques are, furthermore, based on the finding that it can be desirable to minimize latency due to the RA procedure on the one hand side; and, on the other hand side, minimize the amount of interference caused by transmitting the RA message at high transmission power levels and/or on inappropriate beams.

According to various examples, retransmission strategies for transmitting multiple retransmissions of the RA message are provided which enable to balance such design goals.

According to examples, this is achieved by flexibly controlling the retransmission strategy. In particular, network control of the retransmission strategy is possible. According to examples, a UE receives a control message from a BS of the wireless network. The control message is indicative of at least one retransmission parameter for a RA message (RA Msg.1). The RA message includes a RA preamble: The RA message which includes the RA preamble is also referred to as RA Msg.1. The method also includes transmitting, on a plurality of beams, a plurality of retransmissions of the RA Msg.1. Here, the plurality of beams is selected in accordance with the at least one retransmission parameter.

The RA preamble as used herein may be a pattern or signature. The value of the RA preamble may facilitate distinguishing between different UEs. The RA preamble may be selected from a set of candidate preambles, e.g., 64 or 128 candidate preambles. The different candidate preambles may use orthogonal codes. For example, a Zaddoff-Chu sequence may be used for generating the RA preamble. The Zaddoff-Chu sequence may form a base sequence or root sequence. Different cyclic shifts may then be applied to obtain the specific RA preamble. Different UEs may use different cyclic shifts. Code division duplexing is possible. Said selection may occur randomly or non-randomly, e.g., depending on whether a contention based RA procedure or a non-contention based RA procedure is employed. For example, the document 3GPP TSG RAN WG1 #86 bis R1-1609119 discloses techniques associated with RACH preamble design for 3GPP NR that could be employed in connection with determining the RA preamble.

Hence, it is possible to flexibly control the plurality of beams which are used for implementing the transmission of the plurality of retransmissions of the RA Msg.1. Network control thereof is possible.

Thus, according to examples, the BS may control the at least one retransmission parameter. The at least one retransmission parameter provides the BS with control over the retransmission strategy applied by the UE. For example, the at least one retransmission parameter may provide the BS with control over the beam switching employed by the UE when transmitting the multiple retransmissions of the RA Msg.1. Hence, in other words, the at least one retransmission parameter may be associated with beam switching and, thus, a plurality of beams on which the retransmissions of the RA Msg.1 are transmitted. Alternatively or additionally, the at least one retransmission parameter may provide the BS with control over the power ramping employed by the UE when transmitting the multiple retransmissions of the RA Msg.1.

Hence, in other words, the at least one retransmission parameter may be associated with power ramping and, thus, a plurality of transmission power levels at which the retransmission of the RA Msg.1 are transmitted.

By means of the at least one retransmission parameter, it may be possible to define a set of rules, e.g., to define an algorithm, to control the behavior of the UE in the retransmission strategy, e.g., when performing beam switching and/or power ramping.

As explained with respect to the FIGs. In greater detail hereinafter, the at least one retransmission parameter may provide the BS with high-level control over the retransmission strategy. In particular, the at least one retransmission parameter may impose certain constraints to be obeyed by the specific retransmission strategy selected by the UE. For example, it would be possible that the at least one retransmission parameter is associated with beam switching. Then, the UE may select—within the constraints imposed by the respective at least one retransmission parameter—the particular beams on which a plurality of retransmissions of the RA Msg.1 are transmitted. However, the specific selection of the beams and, optionally, the specific selection of the sequence of the beams may be up to the particular retransmission strategy implemented by the UE, which may be UE proprietary. Likewise, it would be possible that the at least one retransmission parameter is associated with power ramping. The UE should select the plurality of beams based on the at least one retransmission parameter. The UE may select—within the constraints imposed by the respective at least one retransmission parameter—the particular transmission power levels on which the plurality of retransmissions of the RA Msg.1 are transmitted. However, the specific selection of the transmission power levels and, optionally, the specific selection of the sequence of transmission power levels may be up to the particular retransmission strategy implemented by the UE, which may be UE proprietary. As will be appreciated from the above, they may be shared control over the retransmission strategy. For example, while the BS imposes high-level control over the retransmission strategy, the UE may then specifically select the particular retransmission strategy using low-level control. This helps to optimize latency and/or channel occupancy from, both, the BS perspective, as well as the UE perspective.

The at least one retransmission parameter can be transmitted by the network, e.g., a BS, to UEs that are camping in a cell—i.e., while the UEs are operating in idle mode in which a data connection is not maintained with the network. For example, the at least one retransmission parameter may be communicated on a broadcast channel, e.g., on an information block such as the system information block as part of the physical RA channel (PRACH) configuration. Then, all UEs camping in that cell can receive the respective control message to obtain the at least one retransmission parameter. Instead of such a broadcasted transmission of the control message as an information block, it would also be possible that the control message is dedicated to the user equipment. For example, such a dedicated control message—e.g., a Layer 3 Radio Resource Control (RRC) control message—may be transmitted by the BS while the UE maintains the data connection with the network, i.e., while the UE is operating in connected mode. It would be possible that such a dedicated control message is transmitted to the UE upon its first registration in a cell. In such examples, it is thus possible to transmit an explicit indication of the at least one retransmission parameter.

In other examples, it would be also possible to not transmit an explicit indication of the at least one retransmission parameter; but, implicitly, associate the at least one retransmission parameter with another connection parameter. For example, the at least one retransmission parameter may be associated with an access service class. For example, a high-priority UE—i.e., a UE grouped into a high-priority access service class—may rely on at least one retransmission parameter that allows for a greater amount of power ramping; hence, e.g., the maximum number of consecutive retransmissions of the RA Msg.1 on the same beam that may use different transmission power levels may be dimensioned larger for the high-priority UE if compared to a low-priority UE. This is based on the finding that for such a UE it can be in particularly important to be able to connect to the network at a low latency; therefore, a somewhat increased interference may be acceptable for high-priority UEs. Such high-priority UE may, e.g., be identified dependent on its UE category and/or UE capability. Alternatively or additionally, such high-priority UE may be identified by a class of quality of service level determined within the communication between the UE and the network.

In the various examples described herein, various retransmission parameters may be considered.

(I) A first retransmission parameter may relate to beam switching. The first retransmission parameter may be associated with a plurality of beams on which retransmissions of the RA Msg.1 are transmitted. (II) A second retransmission parameter may relate to power ramping. The second retransmission parameter may be associated with a plurality of transmission power levels at which retransmissions of the RA Msg.1 are transmitted. (III) A third retransmission parameter may relate to the overall retransmission strategy. (I)-(III) may be used alone or in combination with each other.

(I) For example, it would be possible that the at least one retransmission parameter includes a maximum number of beam switches for a given transmission power level. For example, generally, the at least one retransmission parameter may include a threshold count of transmission beams for transmitting the plurality of retransmissions of the RA Msg.1. Specifically, it would be possible that the threshold count of transmission beams is associated with a count of a contiguous series of transmission beams used for transmitting the plurality of retransmission of the RA Msg.1 at a given transmission power level, i.e., at the same transmission power level.

A further example of a retransmission parameter which relates to beam switching may be associated with the maximum number of consecutive retransmissions with the same beam. Generally, the at least one retransmission parameter may include a threshold count of the plurality of retransmissions. Specifically, this threshold count of the plurality of retransmissions may be associated with a count of a contiguous series of retransmissions of the RA Msg.1 on the same beam; here, the transmission power level may be varied or may not be varied—hence, the count of employed transmission power levels on that same beam may be smaller or equal to the count of retransmissions.

(II) Generally, it would be possible that the at least one retransmission parameter includes a threshold count of transmission power levels. Specifically, this threshold count of transmission power levels is associated with a count of a contiguous series of transmission power levels for retransmissions of the RA message on the same beam of the plurality of beams (III) It would also be possible that a threshold count of a plurality of retransmissions is associated with a count of total retransmissions of the RA Msg.1 at a given RA resource. Hence, the threshold count may be defined with respect to the total retransmission across all different beams and all different transmission power levels. If after the total count of retransmissions the RA Msg.1 has not been successfully delivered, the transmission of the RA Msg.1 may be aborted; then a RA failure may be reported, e.g., to higher layers of a transmission protocol stack implemented at the UE.

By such retransmission parameters, it is possible to tailor the retransmission strategy. In particular, a frequency of occurrence of the beam switches and power ramps may be controlled. This helps to balance latency and spectrum occupancy.

Figure 1:
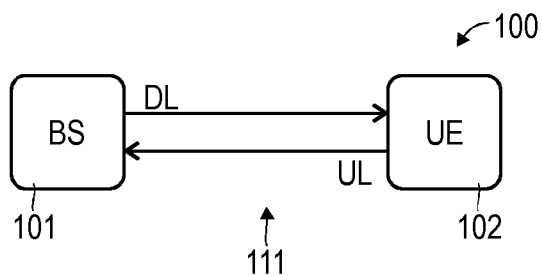

FIG. 1 schematically illustrates a wireless communication network 100 that may benefit from the techniques disclosed herein. The network may be a 3GPP-standardized network such as 3G, 4G-LTE, or upcoming 5G-NR. Other examples include point-to-point networks such as Institute of Electrical and Electronics Engineers (IEEE)-specified networks, e.g., the 802.11x Wi-Fi protocol or the Bluetooth protocol. Further examples include 3GPP NB-IOT or eMTC networks.

The network 100 includes a BS 101 and a UE 102. A wireless link 111 is established between the BS 101 and the UE 102. The wireless link 111 includes a DL link from the BS 101 to the UE 102; and further includes an UL link from the UE 102 to the BS 101.

Time-division duplexing (TDD), frequency-division duplexing (FDD), space-division duplexing (SDD), and/or code-division duplexing (CDD) may be employed for mitigating interference between UL and DL. Likewise, TDD, FDD, SDD, and/or CDD may be employed for mitigating interference between multiple UEs communicating on the wireless link 111 (not shown in FIG. 1).

The UE 102 may be one of the following: a smartphone; a cellular phone; a table; a notebook; a computer; a smart TV; an MTC device; an eMTC device; an IoT device; an NB-IoT device; a sensor; an actuator; etc.

Figure 2:
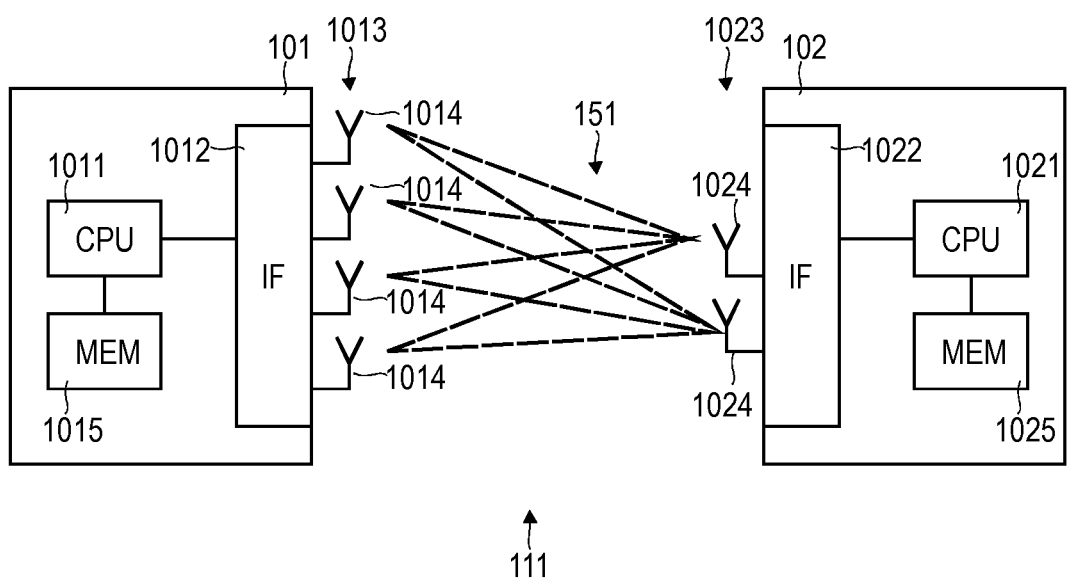

FIG. 2 schematically illustrates the BS 101 and the UE 102 in greater detail. The BS 101 includes a processor 1011 and an interface 1012, sometimes also referred to as frontend. The interface 1012 is coupled via antenna ports (not shown in FIG. 2) with an antenna array 1013 including a plurality of antennas 1014. In some examples, the antenna array 1013 may include at least 30 antennas 1014, optionally at least 110 antennas, further optionally at least 200 antennas. Sometimes, a scenario implementing a large number of antennas 1014 is referred to as full dimension multi-input multi-output (FD-MIMO) or massive multi-input multiple-output (Massive MIMO, MaMi). Each antenna 1014 may include one or more electrical traces to carry a radio frequency current. Each antenna 1014 may include one or more LC-oscillators implemented by the electrical traces. Each trace may radiate electromagnetic waves with a certain beam pattern. The antenna array 1013 facilitates transmit beamforming and receive beamforming.

The BS 101 further includes a memory 1015, e.g., a non-volatile memory. The memory may store program code that can be executed by the processor 1011. Executing the program code may cause the processor 1011 to perform techniques with respect to: participating in a RA procedure with the UE 102; transmitting, to the UE 102, a control message which is indicative of at least one retransmission parameter of a RA Msg.1; determining the at least one retransmission parameter; etc. Thus, the processor 1011 and the memory 1015 form a control circuitry.

The UE 102 includes a processor 1021 and an interface 1022, sometimes also referred to as frontend. The interface 1022 is coupled via antenna ports (not shown in FIG. 2) with an antenna array 1023 including a plurality of antennas 1024. In some examples, the antenna array 1023 may include at least 6 antennas, optionally at least 16 antennas, further optionally at least 32 antennas. Generally, the antenna array 1023 of the UE 102 may include fewer antennas 1024 then the antenna array 1013 of the BS 101. Each antenna 1024 may include one or more electrical traces to carry a radio frequency current. Each antenna 1024 may include one or more LC-oscillators implemented by the electrical traces. Each trace may radiate electromagnetic waves with a certain beam pattern. The antenna array 1023 facilitates transmit beamforming and receive beamforming.

The UE 102 further includes a memory 1025, e.g., a non-volatile memory. The memory 1025 may store program code that can be executed by the processor 1021. Executing the program code may cause the processor 1021 to perform techniques with respect to participating in a RA procedure with the BS 101; receiving, from the BS 101, a control message which is indicative of at least one retransmission parameter of the RA Msg.1; transmitting a plurality of retransmissions of the RA Msg.1; implementing a beam switch and/or transmission power level ramp strategy when transmitting the plurality of retransmissions, in accordance with the at least one retransmission parameter; etc. Thus, the processor 1021 and the memory 1025 form a control circuitry.

FIG. 2 also illustrates aspects with respect to propagation channels 151. FIG. 2 schematically illustrates that different propagation channels 151 (dashed lines in FIG. 2) are implemented on the wireless link 111. The different propagation channels 151 are associated with different beams. For example, to implement a certain propagation channel 151 for UL communication of a message, a certain beam may be selected for the antenna array 1023 of the UE 102. This may be done by selecting appropriate antenna weights (beamforming).

Beamforming may be implemented when transmitting signals (transmit beamforming) and/or when receiving signals (receive beamforming). If there is reciprocity of the wireless link 11, then it may be assumed that for a certain DL propagation channel 151 experiencing good quality, also the reverse UL propagation channel 151 will experience good quality.

Different ones of the propagation channels 151 may have different transmission characteristics such as number of reflections, path loss, and generally transmission reliability and/or capacity. In particular, different propagation channels 151 can have different fading profiles at the position of the respective receiver. Fading typically occurs due to destructive interference of reflected electromagnetic waves carrying the signals at the position of the receiver. Channel measurements may quantify the reliability of the respective beams.

The channel measurements may rely on DL pilot signals, sometimes referred to as reference signals, or DL synchronization signals which have a well-defined signal pattern. Such DL pilot signals or DL synchronization signals may be broadcasted by the BS 101 and may thus be received by the UE 102 even when operating in idle mode with no data connection with the network 100 being set up. If there is full or partial reciprocity, then it is possible to conclude back on favorable UL beams based on the DL pilot signals or DL synchronization signals. Such channel measurements may be used in the various examples described herein.

Figure 3:
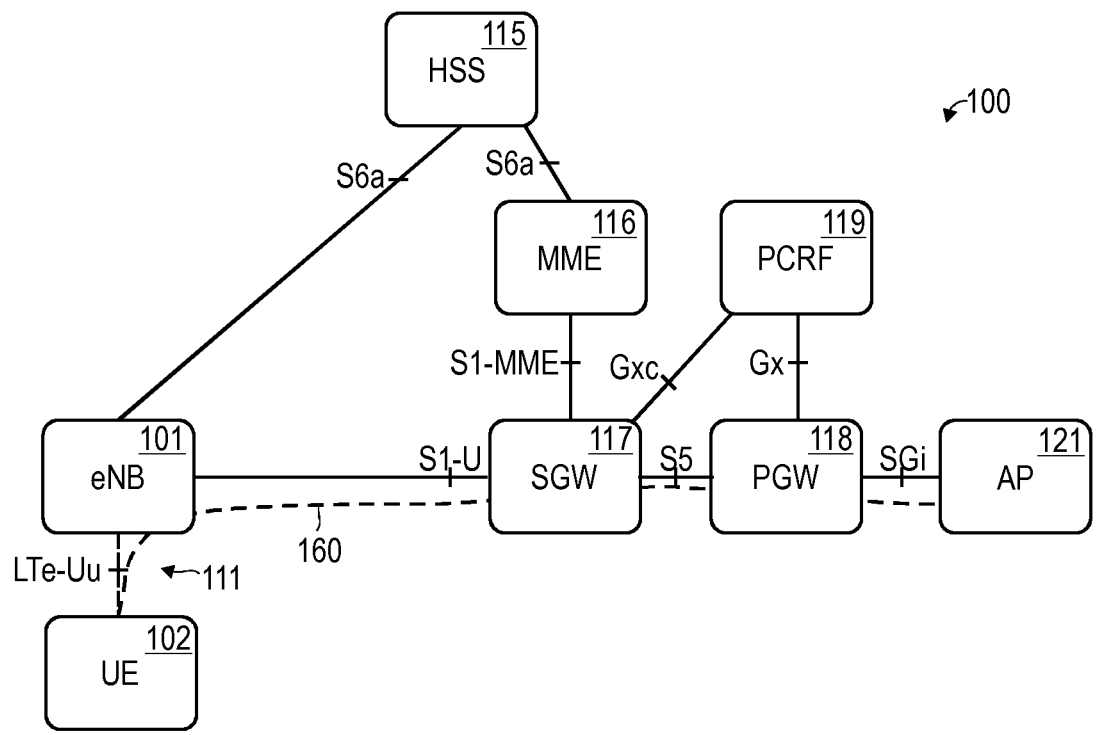

FIG. 3 illustrates aspects with respect to the architecture of a cellular network 100 according to some examples implementations. In particular, the cellular network 100 according to the example of FIG. 3 implements the 3GPP LTE architecture, sometimes referred to as evolved packet system (EPS). This, however, is for exemplary purposes only. In particular, various scenarios will be explained in the context of the wireless link 111 between the UE 102 and the BS 101 operating according to the 3GPP LTE radio access technology (RAT) for illustrative purposes only. Similar techniques can be readily applied to various kinds of 3GPP-specified RATs, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. The network 100 may be operating according to the 3GPP NR protocol. A further particular example is the 3GPP NB-IoT RAT. The 3GPP NB-IoT RAT may be based on the 3GPP LTE RAT, i.e., the Evolved UMTS Terrestrial Radio Access (E-UTRA). Further, the NB-IoT RAT may be combined with the EPS as illustrated in FIG. 3. The various examples disclosed herein may be readily implemented for the 3GPP NB-IoT RAT, alternatively or additionally. Similarly, the techniques described herein may be employed for MTC. Other examples include other types of networks, e.g., Institute of Electrical and Electronics Engineers (IEEE) 802.11X Wireless Local Area Network, Bluetooth or Zigbee.

The 3GPP LTE RAT implements a HARQ protocol. The HARQ protects data communicated via the wireless link 111. FEC and retransmission are employed in this respect.

The UE 102 is registered to the network 100. In the example of FIG. 3, the UE 102 is connected to the network 100 via the wireless link 111 to a BS 101 of the cellular network 100. The BS 101 and the UE 102 implement the evolved UMTS terrestrial radio access technology (E-UTRAN); therefore, the BS 101 is labeled evolved node B (eNB) in FIG. 3. In NR, the BS 101 is known as g Node B (gNB). In other examples, the UE 102 may be registered to the network 100, but no active data connection 160 may be maintained. To set-up the connection 160, a RA procedure may be performed by the UE 102 and the BS 101.

For example, the UE 102 may be selected from the group including: a smartphone; a cellular phone; a table; a notebook; a computer; a smart TV; a MTC device, an IoT device; a sensor; an actuator; etc.

An MTC or IoT device is typically a device with a low to moderate requirement on data traffic volumes and loose latency requirements. Additionally, communication employing MTC or IoT devices should achieve low complexity and low costs. Further, energy consumption of an MTC or an IoT device should be comparably low in order to allow battery-powered devices to function for a comparably long duration: The battery life should be sufficiently long. For example, the IoT device may be connected to the EPS via the NB-IoT RAT.

Communication on the wireless link 111 can be in UL and/or DL direction. The BS 101 is connected with a gateway node implemented by a serving Gateway (SGW) 117. The SGW 117 may route and forward payload data and may act as a mobility anchor during handovers of the UE 102.

The SGW 117 is connected with a gateway node implemented by a packet data network Gateway (PGW) 118. The PGW 118 serves as a point of exit and point of entry of the cellular network 110 for data towards a packet data network (PDN; not shown in FIG. 3): for this purpose, the PGW 118 is connected with an access point node 121 of the packet data network. The access point node 121 is uniquely identified by an access point name (APN). The APN is used by the UE 102 to seek access to the packet data network.

The PGW 118 can be an endpoint of an end-to-end connection 160 for packetized payload data of the UE 102. The end-to-end connection 160 may be used for communicating payload data of a particular service. Different applications/services may use different end-to-end connections 160 or may share, at least partly, a certain end-to-end connection.

In a 3GPP NR scenario, the SGW 117 and PGW 118 functionality may be implemented by a user plane function (UPF).

The end-to-end connection 160 may be implemented by one or more bearers which are used to communicate service-specific data. An EPS bearer which is characterized by a certain set of quality of service parameters indicated by the QoS class identifier (QCI). The end-to-end connection may be, at least partly, defined on a Layer 2 or Layer 3 of a transmission protocol stack implemented by the BS 101 and the UE 102 for communicating on the wireless link 111. For example, in connection with the 3GPP LTE E-UTRAN, the data connection 160 may be implemented on the Radio Resource Control (RRC) layer.

A control layer of the core network includes a mobility management entity (MME) 116. The MME 116 functionality may be implemented by a Access and Mobility Management Function (AMF) and the Session Management Function (SMF) in a 3GPP NR framework.

The MME 116 handles mobility and security tasks such as paging and access credentials. The MME 116 also keeps track of the operational mode of the UE 102, e.g., whether the UE 102 operates in connected or disconnected mode. The MME 116 is the termination point of the non-access stratum (NAS) connection, i.e., a control connection implemented on the layer above the RRC layer.

A home subscriber server (HSS) 115 includes a repository that contains user- and subscriber-related information such as authentication and subscription information. In 3GPP NR, such functionality may be implemented by the Authentication Server Function (AUSF) and/or the Unified Data Management (UDM) functionality.

A Policy and Charging Rules Function (PCRF) implements policy control to thereby facilitate a certain QoS. The respective function is implemented by the Policy Control Function (PCF) in the 3GPP NR framework.

Figure 4:
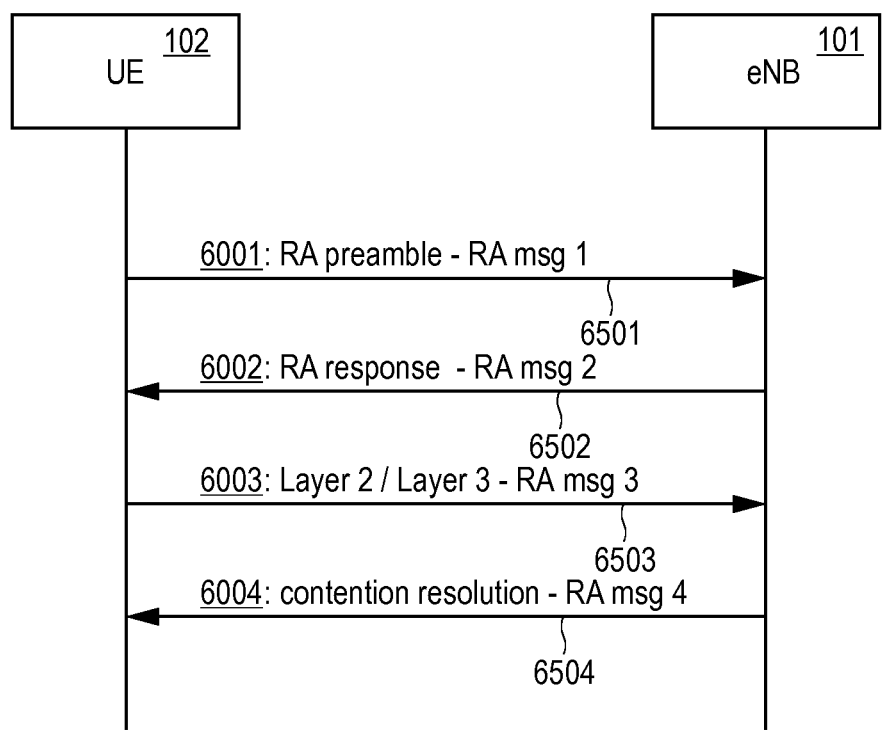
FIG. 4 is a signaling diagram of a RA procedure according to various examples.

FIG. 4 schematically illustrates aspects with respect to a RA procedure. FIG. 4 is a signaling diagram of communication between the UE 102 and the BS 101. The RA procedure includes four steps, starting with a RA Msg.1 6001 including a RA preamble being transmitted from the UE 102 to the BS 101 in 6501. This is followed in 6502 by a RA response (Msg.2) 6002 including an uplink scheduling command; this is addressed to the UEs 102 RA Radio Network Temporary Identity (RA-RNTI). The UE 102 then, at 6503, sends a connection request message (RA Msg.3) 6003 including a Cell Radio Network Temporary Identity (C-RNTI). This is for setting up the data connection 160 on layer 2 and layer 3 of a respective transmission protocol stack. The eNB responds with a contention resolution message (RA Msg.4) 6004 at 6504 and any potential contention between other UE's may be resolved.

The message 6004 may be scheduled three subframes after the RA Msg.1 6001. If the connection attempt of the UE 102 to the network 100 is successful, the data connection 160 may be established. Then, wireless communication of payload UL data and/or payload DL data along the data connection 160 can commence.

There are various trigger criteria conceivable for the RA procedure. Examples include reception of a network paging message by the UE 102 or of a wake-up signal. Further examples include UL payload data scheduled for transmission to the network 100. Further examples include a transition of the UE 102 from an idle mode to a connected mode, e.g., RRC idle to RRC connected in 3GPP LTE.

FIG. 4 illustrates an example in which the RA Msg.1 6001 is successfully received by the BS 101 at 6501. Thus, the BS 101 responds with the message 6002. The UE 102 expects to receive the message 6002 within a certain time window 6899. If the UE 102 does not receive any response or cannot decode the response, it may send a retransmission of the RA Msg.1 6001. Thus, in other words, the retransmission of a successive RA Msg.1 6001 is conditional on the unsuccessful reception of a preceding RA Msg.1 6001. A corresponding scenario is illustrated in connection with the example of FIG. 5.

Figure 5:
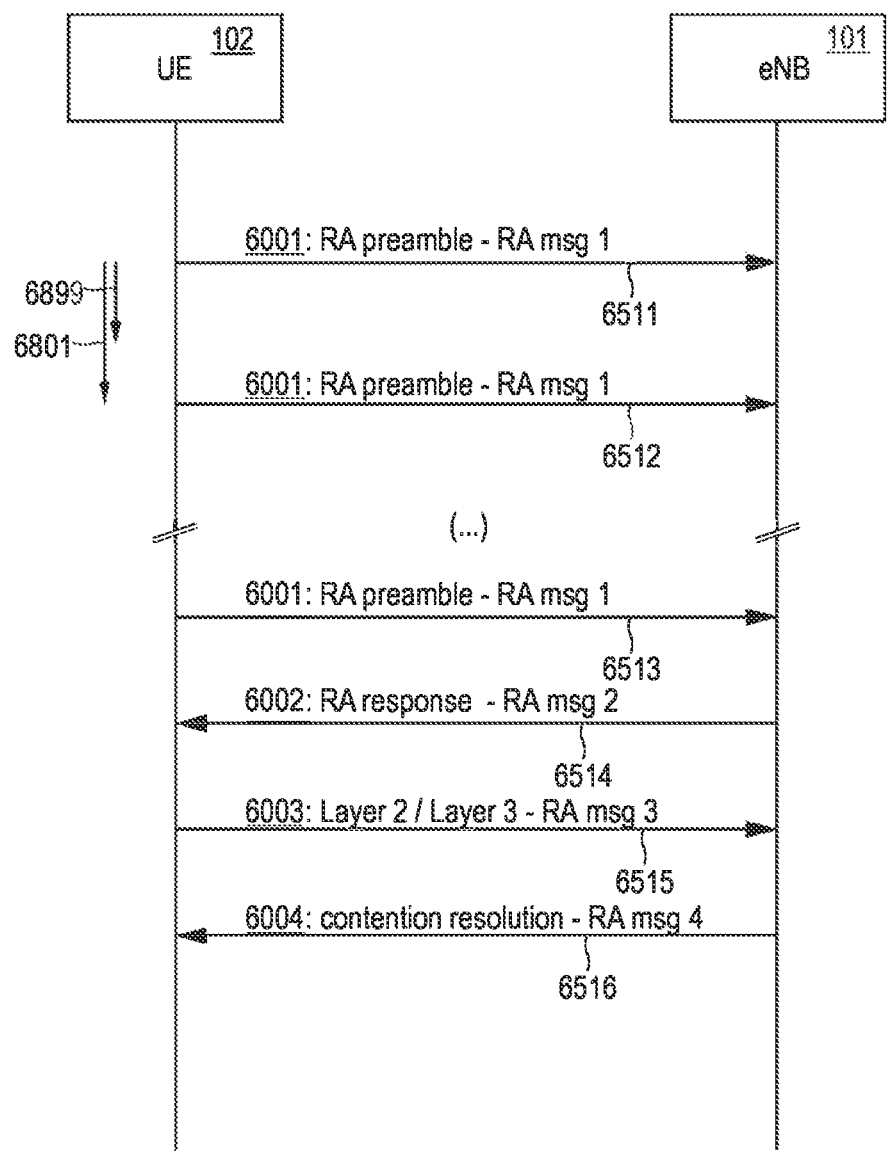
FIG. 5 is a signaling diagram of a RA procedure according to various examples.

FIG. 5 schematically illustrates aspects with respect to a RA procedure. FIG. 5 is a signaling diagram of communication between the UE 102 and the BS 101. In the example of FIG. 5, at 6511, the RA Msg.1 6001 is transmitted by the UE 102, but not received by the BS 101. The RA Msg.1 6001 is not successfully delivered, i.e., reception is unsuccessful.

Hence, the BS 101 does not respond with the RA response (RA Msg.2) 6002. After a certain time duration (back-off time duration) 6801, the UE 102 transmits a retransmission of the RA Msg.1 6001, at 6512. In the example scenario FIG. 5, the BS 101 also does not receive the RA message 1 transmitted at 6512.

Thus, generally speaking, the retransmission of the successive RA Msg.1 6001 at 6513 is conditional on the unsuccessful reception of the preceding RA Msg.1 6001 at 6511. This conditional retransmission can be implemented by checking whether the preceding RA Msg.1 6001 has been received at 6511, upon transmitting the preceding RA Msg.1 6001 at 6511. This check in turn can be implemented by attempting to receive the RA Msg.2 6002 during the time window 6899. Then, transmitting multiple repetitions of the RA Msg.1 6001 can be aborted if the preceding RA Msg.1 6001 has been successfully received at 6511. This, however is not the case in the scenario of FIG. 5 and, thus, the UE 102 then continues to transmit retransmissions of the RA Msg.1 6001—until, finally, the BS 101 successfully receives the RA Msg.1 6001 at 6513. Then, 6514-6516 correspond to 6002-6004.

The multiple retransmissions of the RA Msg.1 6001 are all transmitted in a common RA resource. There may be a mapping of multiple synchronization signal (SS) blocks using different BS transmit beams and multiple RA resources. The RA resources may be defined as time-frequency resource elements of a resource grid which are identified by the mapping. The mapping may be signaled together with the other RA configuration as part of an information block. During SS reception, the UE may perform channel measurements and thus the UE, e.g., can identify the estimated best beam based on reciprocity. Then, the UE may also conclude on the targeted RA resource based on the identified best beam.

Hereinafter, strategies for implementing the plurality of retransmissions of the RA Msg.1 6001 are described. In particular, it would be possible that the plurality of retransmissions of the RA Msg.1 6001 are transmitted on a plurality of beams and/or are transmitted at a plurality of transmission power levels. This is illustrated in connection with FIGS. 6 and 7.

FIG. 6 schematically illustrates aspects with respect to a plurality of beams 311-313. FIG. 6 is a schematic polar plot of the signal strength of transmitted signals for different beams 311-313. In the example of FIG. 6, the UE 102 is configured to transmit on different beams 311-313. As illustrated by the dashed arrows, it is possible that beam switching between the different beams 311-313 is employed. In the example of FIG. 6, while the beam 311-313 is varied, the transmission power level 321 is fixed. Hence, a contiguous series of beams 311-313 used for transmitting the plurality of retransmissions of the RA message 1 at the same transmission power level is implemented.

Such beam switching is illustrated in connection with the example of FIG. 6 may be employed for transmitting multiple retransmissions of the RA Msg.1 6001.

FIG. 7 schematically illustrates aspects with respect to a plurality of transmission power levels 321-323. FIG. 7 is a schematic polar plot of the signal strength of transmitted signals for different transmission power levels 321-323. In the example of FIG. 7, the UE 102 is configured to transmit at different transmission power levels 321-323. As illustrated by the dashed arrows, it is possible that transmission power levels switching between the different transmission power levels 321-323 is employed. In the example of FIG. 7, while the transmission power level 321-323 is varied, the beam 311 is fixed.

Such transmission power level switching as illustrated in connection with the example of FIG. 7 may be employed for transmitting multiple retransmissions of the RA Msg.1 6001.

FIG. 8 is a flowchart of a method according to various examples. For example, the method according to FIG. 8 may be executed by the control circuitry 1021, 1025 of the UE 102.

First, at box 8001, a control message is received (cf. FIG. 10, where a respective control message 6021 is transmitted by the BS 101 and received by the UE 102 at 6521). The control message is indicative of at least one retransmission parameter for a RA message 1 which includes a RA preamble. For example, the at least one retransmission parameter may be for the RA Msg.1 6001 (cf. FIGS. 5 and 6).

The control message may be broadcasted as an information block; thereby, any UE which camps on the respective cell may be able to receive the control message—even if the UE operates in idle mode. Alternatively or additionally, it would also be possible that the control message is dedicated to the respective UE. Hence, the control message may be a Layer 3 control message, e.g., a RRC control message, of a respective transmission protocol stack.

The control message may indicate the at least one retransmission parameter explicitly or implicitly. For example, the control message may include an indicator which explicitly indicates the at least one retransmission parameter. An implicit indication may rely on a look-up table and respective indices identifying entries of the look-up table.

In box 8002, a plurality of beams is selected. Box 8002 is optional.

For example, if the UE does not support a plurality of beams or, generally, does not support beamforming, a selection may not occur.

Said selecting in box 8002 may be in accordance with the at least one retransmission parameter. Hence, any boundary conditions imposed by the at least one retransmission parameter may be obeyed when selecting the plurality of beams.

For example, it would be possible that the control message is indicative of a count of beams to be used for transmitting the RA message 1. The at least one retransmission parameter may thus be associated with a plurality of beams used for transmitting retransmissions of the RA message 1. Then, the particular beams to be used can be selected accordingly. For example, it would be possible that the at least one retransmission parameters includes a threshold count of transmission beams for transmitting the plurality of retransmissions of the RA message 1. Then, the plurality of beams used for transmitting the RA message 1 can be selected such that the count of the plurality of beams is smaller or equal to the threshold count. For example, it would be possible that the threshold count of beams is associated with a count of a contiguous series of beams used for transmitting the plurality of retransmissions of the RA message 1 at the same transmission power level. In this scenario, it would be possible that the plurality of beams and a series for switching through the beams is selected at box 8002.

When selecting the plurality of beams at box 8002, it would be possible to take into consideration at least one of channel measurements and a hardware capability of a transmitter of the respective UE.

The hardware capability may be defined by a type of beamforming. For example, for a UE that performs analog beamforming, there may be a finite number of possible directions in which the UE can transmit a beam and this may define the hardware capability. For example, the number of beams may be limited by a count of antennas of the UE. For example, if the threshold count of beams associated with a contiguous series of beams used for transmitting the plurality of retransmissions of the RA message 1 at the same transmission power level—as indicated by the control message—is higher than a number of beams supported by the UE hardware capability, then the beams may be selected so as to avoid duplicate retransmissions at the same beam at the same transmission power level. This may be implemented by a scaling of the threshold count at the UE.

The channel measurements may benefit from reciprocity. For example, if a UE experiences full beam reciprocity, the best receive beam—on which, e.g., synchronization signals or pilot signals may be received—is typically also the best transmit beam. The amount of reciprocity experienced by a UE may vary between no reciprocity and full reciprocity. Partial reciprocity is possible; in particular in such a scenario of partial reciprocity, the UE may conclude with some reliability on a subset of beams that could be suited for transmitting the RA message 1 to the BS. These may be selected in box 8002.

In a further example, after the UE has switched through all beams that are favored based on the channel measurements, it would be possible to perform a fallback to the remaining beams that are not favored based on the channel measurements. Hence, the channel measurement may, generally, provide a prioritization between transmitting the plurality of retransmissions of the RA message 1 on the various beams.

Considering the hardware capability and/or channel measurements may help to avoid unsuccessful or unnecessary retransmissions. For example, duplicate retransmissions using the same transmission power level at the same beam may be avoided. For example, retransmission on beams which—due to reciprocity and based on the channel measurements—have a very low likelihood of successful delivery of the RA message 1 may be avoided.

In some examples, it would also be possible to allocate the candidate beams into a number of beam groups. Each group may be associated with a threshold count of transmission power levels. Hence, per group there may be an upper limit to how many power ramping steps are implemented. There could also be a lower limit per group.

It would be possible that a group of beams is formed based on the probability of successful delivery of the RA message 1, e.g., based on an estimate of the quality of the beam obtained from channel measurements. Hence, in other words, it would be possible that for each transmission beam group, the respectively allocated beams are selected from a plurality of candidate beams based on an estimated likelihood of successful transmission of the RA message 1 or, generally, channel measurements.

Different groups could, alternatively or additionally, be associated with different beam widths and/or beam directions. Beams may be allocated to groups based on geometrical properties such as width or direction. For example, all beams having a beam width smaller than a threshold may be allocated to a first group; while all beams having a beam width larger than a threshold may be allocated to the second group. For example, all beams being directed into the upper half hemisphere of the UE may be allocated to a first group; while all beams having a beam width being directed to the lower half hemisphere of the UE may be allocated to the second group.

Different groups could, alternatively or additionally, be associated with different antenna panels or patches. Beams could be allocated to groups depending on the associated panel. For example, a UE may include a plurality of antenna arrays, each antenna array being associated with the respective antenna panel. Phased transmission may be possible across the antennas of a common antenna panel. Then, it may be possible that the different antenna panels are oriented perpendicular or otherwise orthogonal to each other. Different antenna panels may enclose a significant angle. Thereby, beams formed by phased transmission of the antennas of a first antenna panel are typically enclosing a significant angle with beams formed by phased transmission of antennas of a second antenna panel.

The plurality of retransmissions of the RA message 1 can then be transmitted by iteratively switching through the plurality of transmission beam groups. For example, first, retransmissions may be implemented for the most probable group, e.g., at a lower reference transmission power level. If the RA message 1 is not successfully delivered, beam switch switching to the next beam of that group is implemented. If all beams of the respective group have been switched to, the transmission power level can be increased by a certain increment and a beam switching counter may be reset. Then, again, retransmissions may be implemented on all beams of the current group. When a threshold count of transmission power levels—that may be defined by the at least one retransmission parameter associated with the plurality of transmission power levels and as received at box 8001—is reached, then irrespective of the current transmission power level, the respective counter may be reset and retransmissions may be implemented on the beams of the next group. Thus, it would be possible to cascade through the transmission power levels; i.e., implement the same transmission power levels for all groups. Alternatively, it would also be possible to continuously increase the transmission power level from group to group. Here, one or more counters may be defined per-group. This helps to facilitate efficient retransmission.

In other examples, it would be possible to cyclically iterate/toggle through the different groups. For example, it would be possible to, first, transmit a first retransmission of the RA message 1 on a beam of a first group; then, second, it would be possible to transmit a second retransmission on a beam of a second group; of the RA Msg.2; and so on. Thereby, significant variation of the beams from retransmission to retransmission may be facilitated, in particular, if beams are allocated to groups depending on their direction and/or panel.

In the various examples described herein, different techniques may be employed for selecting the plurality of beams in accordance with the at least one retransmission parameter. In a first example, the at least one retransmission parameter may include a threshold count of beams. Hence, the at least one retransmission parameter may be associated with a plurality of beams. Then, it would be possible to select as many beams as possible—while still obeying the constraint imposed by the threshold count of beams. Here, selecting as many beams as possible can, furthermore, obey any constraints imposed by the hardware capability of the UE. For example, if the hardware capability of the UE is more limiting in terms of the available count of beams if compared to the threshold count of beams of the at least one retransmission parameter, it may be possible to select the maximum number of beams supported by the hardware capability—thereby, also, obeying the constraint imposed by the threshold count of beams of the at least one retransmission parameter. In a second example, it would be possible that the at least one retransmission parameter already explicitly indicates the particular beams to be used by the UE. For example, the at least one retransmission parameter may include a list of beams—e.g., identified by directions and, optionally, beam widths—that are to be used by the UE. Then, these beams may be selected 1:1 by the UE. In a third example, it would be possible that the at least one retransmission parameter explicitly indicates a plurality of candidate beams that could be used by the UE. Then, the UE may select the plurality of beams which are actually used for transmitting the plurality of retransmissions of the RA message 1 from the plurality of candidate beams—e.g., again, taking into account hardware capability, etc. In a fourth example, the at least one retransmission parameter may be indicative of a threshold count of transmission power levels, e.g., a contiguous series of transmission power levels for retransmission of the RA message 1 on the same beam. Hence, the at least one retransmission parameter may be associated with the plurality of transmission power levels. Here, the at least one retransmission parameter may not be indicative of a threshold count of beams. Then, the UE may determine a minimum and/or maximum transmission power level that should be reached according to a retransmission strategy implemented by the UE. The UE may also determine a transmission power level step size. Such constraints of the power ramping may be determined based on channel measurements. Then, because the count of retransmissions on the same beam is limited on the one hand side; and, on the other hand, the count of retransmission for different transmission power levels is also determined in accordance with the respective threshold of the at least one retransmission parameter, this may impose another constraint on the count of beams to be used by the UE, e.g., defining the minimum number of beams required not to violate the constraint of the threshold count of transmission power levels without beam switching. In such a scenario, it is possible to select the plurality of beams in accordance with such a constraint implicitly imposed by the threshold count of transmission power levels. The UE may switch the beam, but may need to maintain the same transmission power as in the previous beam. In a fifth example, selecting the plurality of beams may also include selecting a sequence of the beam switching. For example, in some scenarios it may be favored to maximize the beam switching per transmission power level; while in other scenarios, it may be favorable to maximize power ramping per beam. Here, respective threshold counts of contiguous series of transmission power levels or beams, respectively, may be obeyed as constraints.

In box 8003, the plurality of transmission power levels used for transmitting the plurality of retransmissions of the RA message 1 is selected. Box 8003 is optional.

Said selecting on box 8003 may be in accordance with the at least one retransmission parameter. Hence, any boundary conditions imposed by the at least one retransmission parameter may be obeyed when selecting the plurality of transmission power levels.

For example, the plurality of transmission power levels may be selected based on a hardware capability. For example, a transmitter of the respective UE may have a maximum transmission power level. Then, the plurality of transmission power levels may be selected to remain below the maximum transmission power level. For example, the UE may be in a situation where it has reached the maximum transmission power level, but still requires to transmit retransmissions of the RA message 1. In such a scenario, the UE can continue to transmit retransmissions on various beams up to a threshold count of retransmissions.

Alternatively or additionally, the plurality of transmission power levels may be selected based on channel measurements. For example, the channel measurements may indicate a comparably limited transmission reliability. Then, there may be a tendency to select higher transmission power levels if compared to a scenario where the channel measurements indicate a high transmission reliability.

This helps to avoid unsuccessful retransmissions, because the transmission power levels are tailored to the actual circumstances.

For example, it would be possible that the UE performs channel measurements for the plurality of beams. Then, the plurality of transmission power levels may be selected based on these channel measurements for the plurality of beams. For example, the UE may determine, for each transmission beam, a path loss. Then, the particular beam having the smallest path loss may be identified and the initial transmission power level of the power ramping across all beams may be selected based on that best transmission beam.

This helps to avoid unsuccessful retransmissions, because the transmission power levels are tailored to the actual circumstances.

It may also be possible to select the plurality of transmission power levels based on a count of the plurality of transmission beams. In other words, there may be some correlation between the transmission power levels and the plurality of beams.

Such an approach is based on the finding that—by means of the control message—there may be BS control over the UE retransmission strategy. However, there could be a situation of mismatch between the network-controlled at least one retransmission parameter and the UE capabilities, e.g., in terms of beam switching. For example, if the available UE beams are significantly less than the allowed beam switches for a given transmission power level, multiple retransmissions at the same transmission power level and at the same beam may result. In another extreme example scenario, the UE beams are significantly higher than the allowed beam switches for a given transmission power level. This could lead to limited beam switching operation and may result in unsuccessful retransmission of the RA message 1. To address this, it is possible to apply a scaling function. The scaling function may depend on the count of the plurality of beams that is actually used by the UE. Here, a UE having a smaller count of beams available—e.g., due to hardware constraints—may employ a smaller number of transmission power levels. This may be achieved, e.g., by scaling down a network-controlled threshold count of transmission power levels.

For further illustration, there may be a situation where there is a mismatch between the count of beams associated with the at least one retransmission parameter as provided by the network on the one hand side—and the hardware capabilities in terms of beams switching of the UE, on the other hand side. For example, it could be possible that the count of beams for transmitting the retransmissions of the RA message 1 is significantly smaller than the threshold count of beams for transmitting the plurality of retransmissions. Then, to avoid a scenario where multiple retransmissions of the RA message 1 are implemented for the same beam at the same transmission power level, a scaling function may be applied. The scaling of the scaling function may be taken into account when selecting the plurality of transmission power levels. For example, the scaling of the scaling function may depend on the count of beams—which may be limited by the hardware capability, as explained above. A UE with a smaller count of beams may also implement a smaller count of beam switching operation, if compared to the UE with a larger countof beams. For example: if a UE with supporting beam (count of beam)=16 then the scaled Nc=4. If UE supporting beam (count of beam)=4 then the scaled Nc=2 . . . and so on . . . . This scaling may affect the count of transmission power, and the increment of the transmission power levels, i.e., the power ramping step. Hence, generally, at least one of the count of the plurality of beam switching, transmission power levels and a step size of the plurality of transmission power levels may be determined based on the count of the plurality of beams.

For example, if a step size of the transmission power levels is 2 dB and a threshold count beam switches for a given transmission power level is Nc=10, while the count of beams is 5, then the retransmission strategy would implement retransmission of the RA message 1 twice at each transmission beam and transmission power level. By selecting the transmission power levels taking into account this mismatch between the count of beams and the threshold count of transmission power levels, such duplicate retransmissions may be avoided. For example, the step size can be set to 1 dB. I.e., for the first five retransmissions on the five different beams, the transmission power level $P_0$ dBm is used; for the sixth to tenths retransmissions on the five different beams, the transmission power level $(P_0+1)$ dBm is used. For the eleventh to fifteenth retransmission—i.e. when UE completed Nc=10 beam switches—the original step size of 2 dB may be used, i.e. the transmission power level is $(P_0+2)$ dBm.

In box 8004, a plurality of retransmissions of the RA message 1 is transmitted on a plurality of beams and, optionally, at a plurality of transmission power levels. The plurality of beams and, optionally, the plurality of transmission power levels as selected in box 8002 and box 8003, respectively, are used. The particular trajectory with which this two-dimensional (2-D) parameter space formed by the plurality of beams and the plurality of transmission power levels is traversed may vary in different scenarios.

FIG. 9 is a flowchart of a method according to various examples. For example, the method according to FIG. 9 may be executed by the control circuitry 1011, 1015 of the BS 101.

Box 8091 is inter-related with box 8001. Here, a control message indicative of at least one retransmission parameter is transmitted. This may facilitate network control of a retransmission strategy of a RA message 1.

It would be optionally possible to determine the at least one retransmission parameter prior to box 8091 at box 8090. Box 8090 is optional. At box 8090 it would be possible to take into account a traffic load at the respective BS. For example, if higher traffic loads are experienced at the BS, then it can be assumed that the likelihood of collisions during the RA procedure is increased; thereby, it may be possible to control the retransmission strategy of the RA message 1 to be more robust. Hence, more a larger count of retransmissions of the RA message 1 may be configured in such a high-load scenario. This helps to tailor the balance between interference and latency for the particular traffic scenario encountered.

Box 8092 is inter-related with box 8002. Here, at least one RA message 1 including a RA preamble is received. In response to receiving the RA message 1, a RA scheduling message may be transmitted (cf. FIGS. 4 and 5, message 6002).

FIG. 11 illustrates aspects with respect to a trajectory 700 with which the 2-D parameter space formed by the plurality of beams 310 (x-axis in FIG. 11) and the plurality of transmission power levels 320 (Y-axis in FIG. 11) is traversed. The trajectory 700 may be determined by a specific retransmission strategy implemented by the UE 102 and, at least partly, controlled by the BS 101 by means of the control message 6021 which is indicative of at least one retransmission parameter. FIG. 11 illustrates the retransmissions 701 (only some of the retransmissions 701, indicated by the black dots, are labeled in FIG. 11 for sake of simplicity).

In the example of FIG. 11, the at least one retransmission parameter includes a threshold count 751 of beams 310 for transmitting the plurality of retransmissions 701 of the RA message 1. Generally, the at least one retransmission parameter may be associated with a plurality of beams 310 for transmitting the plurality of retransmissions 701 of the RA message 1. Specifically, the threshold count 751 is associated with a count $N_C$ of a contiguous series 711 of beams 310 used for transmitting the plurality retransmissions 701. In the example of FIG. 11, $N_C=5$.

In the example of FIG. 11, the at least one retransmission parameter also includes threshold counts 761, 771 for the plurality of retransmissions 701.

The threshold count 761 of the plurality of retransmissions is associated with a count of a contiguous series 712 of retransmissions 701 on the same beam 310; in FIG. 11, the threshold count 761 is $P_C=2$.

The threshold count 771 of the plurality of retransmissions is associated with a count of total retransmissions 701 across all beams 310 and all transmission power levels 320; in FIG. 11, the threshold count 771 is $X_C=15$.

As will be appreciated from FIG. 11, the transmission power level 320 remains constant or increases from retransmissions 701 to retransmission 701; but does not decrease. This limits latency.

In FIG. 11, duplicated retransmissions 701 at the same transmission power level 320 and at the same beam 310 are avoided. This is achieved by appropriately selecting the transmission power levels 320 and the beams 310 for the retransmissions 701 (cf. FIG. 8, boxes 8002, 8003). In the course of said selecting duplicates may be identified and removed. This helps to limit latency.

In the example of FIG. 11, global retransmission counters are employed to keep track of the threshold counts 751, 761. Whenever power ramping is performed, the threshold counter 752 is reset; whenever a beam switch is performed, the threshold counter 762 is reset. Therefore, it is possible to transmit a count of three retransmissions 701 on the same beam 310—even though the threshold count 761 is set to $P_C=2$.

FIG. 11 illustrates the minimum transmission power level 321. The trajectory 700 starts at the minimum transmission power level 321. It would be possible that the minimum transmission power level 321 is determined based on channel measurements. Alternatively or additionally, also the increment 329 of the power ramping may be determined based on the channel measurements. Thereby, it is possible to tailor the transmission power levels 321 to the channel condition. This limits latency and reduces interference. For example, it would be possible that the transmission power levels 320 are selected based on channel measurements for each one of the plurality of beams 310. The beam 310 having the best or worst transmission performance may then be used to determine the minimum transmission power level 321.

Once the threshold count 771 has been reached, a respective counter 772 may be reset. A RA problem may be reported to higher layers. It would be possible that all counters 752, 762, 772 are then reset and after a random back-off time duration, a new RA procedure is attempted (not illustrated in FIG. 11).

The example of FIG. 11, the beams 310 are selected such that the count of beams 310 per transmission power level 320 is maximized. This corresponds to the specific retransmission strategy selected by the UE 102. However, in other examples, other retransmission strategies may be applied by the UE. Then, the beams 310 may be selected differently by the UE 102.

FIG. 12 illustrates aspects with respect to a trajectory 700 with which the 2-D parameter space formed by the plurality of beams 310 (x-axis in FIG. 12) and the plurality of transmission power levels 320 (Y-axis in FIG. 12) is traversed.

FIG. 12 illustrates a scenario where for each beam 311-313 an individual counter 762 is implemented. The counters track the retransmissions 701 on the respective beam 311-313. These counters 762 are not reset when performing beam switching. In the example of FIG. 12, each threshold count of the counters 762 is $P_{C,i}=4$, where i is an index identifying the beams 311-313. By such techniques it becomes possible to control the retransmission strategy at great precision.

FIG. 13 is a flowchart of a method according to various examples. FIG. 13 illustrates the retransmission strategy.

At 8011, the UE 102 receives the control message 6021 which is indicative of a plurality retransmission parameters. In the example of FIG. 12, at least one of the retransmission parameters is associated with beam switching, i.e., with a plurality of beams that are used by the UE 102 for transmitting the retransmissions 701. Specifically, the control message 6021 is indicative of the maximum count of beam switches at a given power level, $N_C$; the maximum count of consecutive retransmissions on the same beam (with or without power ramping), $P_C$, and the total count of retransmissions $X_C$. The minimum transmission power level is set as current power level Pval, e.g., based on channel measurements (cf. FIG. 10, transmission power level 321).

At 8012, it is checked whether a further retransmission is required in view of $X_C$. This may be tracked by the counter 762 (cf. FIGS. 10 and 11).

If a further retransmission 701 is required, at 8013, it is checked whether the maximum count of beam switches at a given transmission power level has reached the respective threshold count 751; this may be tracked by the counter 752 (cf. FIGS. 10 and 11).

If not, at 8014, it is checked—according to some UE proprietary logic of the retransmission strategy—if further beam switching is required. If yes, at 8015 beam switching is performed; and a retransmission 701 of the RA Msg.1 6001 is transmitted at the current transmission power level; the counter 752, n is incremented.

At 8016, it is checked whether the RA Msg.1 6001 has been successfully delivered; for this, it can be checked whether the message 6002 is received. If yes, the RA procedure can commence and the retransmission is aborted. If no, 8012 is re-executed.

If, at 8012, the threshold count of retransmissions $X_C$ has been reached, at 8021 a problem is reported to higher layers. At 8022 it is checked whether a further RA attempt should be performed. If yes, at 8023 a random backoff time is implemented, and all counters may be re-set before re-executing box 8012. Alternatively, also 8011 could be re-executed.

At 8013, it could be judged that the threshold count 751, $N_C$ of successive retransmissions 701 on the same beam has been reached. Then, at 8031, it is checked whether the current transmit power is smaller than a maximum transmit power—e.g., defined by the at least one retransmission parameter and/or a hardware capability of the UE.

If power headroom exists, at 8033, a retransmission 701 of the RA Msg.1 6001 is transmitted at a current transmission power level which has been increased by an increment 329 if compared to the previously valid current transmission power level.

At 8034, it is checked whether the RA Msg.1 6001 has been successfully delivered; for this, it can be checked whether the message 6002 is received. If yes, the RA procedure can commence and the retransmission is aborted. If no, 8035 is executed.

At 8035, it is checked whether the threshold count 761 of contiguous retransmissions 701 on the same beam has been reached. This is tracked by the counter 762, p. p is compared to $P_C$. If yes, beam switching is performed at 8014. If no, p is reset and beam switching is performed at 8036.

FIG. 13 illustrates aspects with respect to a retransmission strategy according to various examples. FIG. 13 shows an illustration of the operation of the beam switching and power ramping as described above. In this example, the UE 102 is configured to increase the transmission power level 320 not more than twice—according to a respective threshold count of transmission power levels indicated by the respective retransmission parameter—, switch the beam 310 three times—according to a respective threshold count of beams—and implement a total of six retransmissions.

In the example of FIG. 13, the UE 102 decides to increase the transmission power level 320 in the first few retransmissions 701. Once the maximum number of consecutive retransmissions with same beam 310 has been reached, the UE 102 switches the beam 310. Once the total maximum number of retransmissions 701 of the RA Msg.1 6001 for a given RA resource 309 has also been reached, the UE aborts retransmissions 701. In case the UE 102 still needs to perform RA, the UE 102 waits for certain duration of random back-off time period. The first new RA Msg.1 6001 retransmission 701 could target another RA resource 309.

Summarizing, above UE beam switching and power ramping operation for retransmisisons of RA message 1 has been discussed.

This included specifically the following examples:

(I) The BS should be able to control the operation of UE beam switching and power ramping for RA message 1 retransmissions by providing the following retransmission parameters: The maximum number of beam switches for a given power level (N); the maximum number of consecutive retransmissions with same beam (P); and the total maximum number of retransmissions of msg.1 for a given RACH resource (X).

(II) The control parameters for the operation of UE beam switching and power ramping could be scaled at UE depending on the available number of UE beams for retransmissions of the RA message 1.

(III) When the UE has reached the maximum count of retransmissions, the UE resets all counters of the above control parameters and may be configured to wait a random back-off time before the UE attempt another new RA procedure.

Specifically, the following rule sets may be employed (while the rule sets may be combined with each other in some examples):

Rule Set 1

If the total amount of retransmissions 701 is below X
If the number of beam switching is lower than the number N (cf. threshold count 771 in FIG. 11)
  The UE 102 may conduct beam switching and the counter of power ramping remains unchanged (cf. FIG. 11, horizontal sections of the trajectory 700).
  If UE 102 does not do beam switching, the counter of power ramping increases and the number of beam switches is reset. The UE 102 may increase the power ramping counter up to P (cf. FIG. 11, vertical sections of the trajectory 700).
  If the consecutive power ramping counter in the same beam is equal to P, the UE 102 conducts beam switching and P is reset (cf. threshold count 761 in FIG. 11).
If the number of beam switching is N (cf. threshold count 751 in FIG. 11).
  If UE 102 has not already reached maximum transmission power level, the counter of power ramping increases and number of beam switches is reset.
  If the UE 102 has reached maximum power, the UE 102 remains at maximum output power and continue the retransmission until it reaches the total number of retransmission X or other predefined threshold count.
If the total amount of retransmissions have reached X (cf. FIG. 13, box 8021).
The UE 102 reports RA problem to upper layer.
The UE 102 resets all counters of the above parameters and waits within a random back-off period time before the UE 102 may attempt another RA cycle.

Rule Set 2

The BS 101 control parameters according to the above will provide the BS 101 with control over the UE 102 beam switching behavior. However, there could be situations of mismatch between the BS 101 control parameters and the UE 102 beam switching capabilities. E.g. in case the available UE 102 Tx beams 310-313 for RA Msg.1 6001 transmissions are significantly less than the allowed beam switches for a given transmission power level, this could lead to multiple retransmissions 701 with the same transmission power level and the same beam. This could be handled by applying a scaling function in the UE 102 to the control parameters above, where the scaling could be done depending on the available number of UE 102 beams 310-313 for RA Msg.1 6001 retransmissions. Hence, the transmission power levels may be selected based on the count of beams 310-313: A UE 102 with a smaller number of the total UE 102 beams 310-313 could have smaller number of the above control parameters compared to the UE 102 with higher number of the total UE 102 TX beams 310-313. This scaling function can also be applied to the power ramping step. E.g. if power ramping step size is 2 dB and N=10 whilst the number of beams 310-313 is 5 then the UE 102 would go through each beam twice with the same power level. Here we allow the power ramping to increase by 1 dB each time the UE 102 goes through all the beams 310-313. That is the first 5 beam sweep, the power $P_0$ dBm is used and in the $6^{th}$ to the $10^{th}$ beam sweeps the power $(P_0+1)$ dBm is used. Hence at the $11^{th}$ to the $15^{th}$ beam sweep (i.e. when UE 102 completed N=10 beam switches) the original step size of 2 dB is used as per the invention, i.e. power is $(P_0+2)$ dBm.

Rule Set 3
  Configure the maximum number of beam switching, N, for power ramping in RA Msg.1 6001 (re)transmission, where,
    when UE 102 conducts beam switching and the number of beam switching is lower than the number N
      The counter of power ramping remains unchanged,
    when UE 102 conducts beam switching and the number of beam switching is N or the UE 102 has switched all of its available beams 310-313
      If UE 102 has not reached maximum power, the counter of power ramping increases
      Otherwise, UE 102 reports RA problem to upper layer
    when the counter of power ramping increases
      The number of beam switching is reset.
  Configure the maximum count of continuously increasing power ramping, P, in a certain beam, where,
    when the configured number is exceeded,
      UE 102 should change its beam for RA preamble retransmission.
    when all available beams 310-313 have exceeded the configured number of power ramping
      report RA problem to upper layers In the above, the "available beams 310-313" are a hardware capability of the UE 102. E.g. for a UE 102 that implements analog UE 102 beamforming, there may be a finite number of possible directions in which the UE 102 can transmit a beam and the number of "available beams 310-313" is this finite number (cf. FIG. 8, box 8002).

Rule Set 4
  UE 102 selects a set of beams 310-313 for PRACH transmission.
  Configure the maximum number of beam switching, N, for power ramping in RA Msg.1 6001 (re)transmission, where,
    when UE 102 conducts beam switching and the number of beam switching is lower than the number N
      The counter of power ramping remains unchanged,
    when UE 102 conducts beam switching and the number of beam switching is N or the UE 102 has switched all of its beams 310-313
      If UE 102 hasn't reached maximum power, the counter of power ramping increases
      Otherwise, UE 102 reports RA problem to upper layer
    when the counter of power ramping increases
      The number of beam switching is reset.
  Configure the maximum count of continuously increasing power ramping, P, in a certain beam, where,
    when the configured number is exceeded,
      UE 102 should change its beam for RA preamble retransmission.
    when all beams 310-313 have exceeded the configured number of power ramping
      report RA problem to upper layers In the above, the "beams 310-313" are determined by the UE 102 through channel measurement. At one extreme, some UEs 102 exhibit beam reciprocity (where the best receive beam is also the best transmit beam). At the other extreme, some UEs 102 have no beam reciprocity. In between these extremes, the UE 102 may have partial reciprocity, where based on measurements of receive beams 310-313, it knows that the best transmit beam is one of 'Y' beams 310-313 selected from all available candidate beams 310-313. In this case, the set of beams 310-313 used for the retransmissions 701 is this set of 'Y' beams 310-313 (cf. FIG. 8, box 8002).

In a sub-example, after the UE 102 has gone through all the beams 310-313 and has reached the max power ramping, the UE will perform beam switching and power ramping on the remaining beams 310-313. I.e., the remaining beams 310-313 are now selected and the procedure is repeated. If the remaining beams 310-313 fail to get a response from the BS, the UE reports failure to the upper layers.

Rule Set 5
  UE 102 selects a set of beams 310-313 for PRACH transmission.
    for each beam, the UE 102 determines a path loss parameter for that beam, or performs another channel measurement. When there are 'Y' beams 310-313, the path losses are $PL_0, PL_1, \ldots PL_{Y-1}$.
    the UE 102 determines the beam with the least path loss, $PL_{min}$, and calculates the initial transmission power level for all beams 310-313 based on that best beam. The initial transmission power level is $P_{0\_min\_PL}$ (cf. minimum transmission power level 321 in FIG. 11).
  Configure the maximum number of beam switching, N, for power ramping in RA Msg.1 6001 (re)transmission, where,
    when UE 102 conducts beam switching and the number of beam switching is lower than the number N
      The counter of power ramping remains unchanged,
    when UE 102 conducts beam switching and the number of beam switching is N or the UE 102 has switched all of its beams 310-313
      If UE 102 has not reached maximum power, the counter of power ramping increases
      Otherwise, UE 102 reports RA problem to upper layer
    when the counter of power ramping increases
      The number of beam switching is reset.
  Configure the maximum count of continuously increasing power ramping, P, in a certain beam, where,
    when the configured number is exceeded,
      UE 102 should change its beam for RA preamble retransmission.
    when all candidate beams 310-313 have exceeded the configured number of power ramping
      report RA problem to upper layers
  When the UE 102 ramps the power on any beam, it ramps the power relative to $P_{0\_min\_PL}$.

In the above:
$P_0$=transmission power level calculated based on PRACH power control and PLmin (cf. minimum transmission power level 321 in FIG. 11)
$P_{step}$=power ramping step size (cf. increment 329 in FIG. 11).

Rule Set 6
  UE 102 selects a set of beams 310-313 for PRACH transmission.
    Each beam, i, has an associated variable $P_{N\_ramp\_i}$, all of which are initialised to zero at the start of the PRACH transmission procedure when the BS 101 configures a maximum number of beams 310-313 for beam switching, 'N', the set of beams 310-313 is the set of 'N' best beams 310-313

Initialise the transmit power on each beam to $P_{0\_i}$.

When the UE 102 transmits on beam, i, it increases the transmit power on that beam by $P_{step}$ and increases variable $P_{N\_ramp\_i}$ by one.

Whenever $P_{N\_ramp\_i}$ equals P, beam i is removed from the set of beams 310-313, i.e., duplicate transmissions on that removed beams 310-313 are thereby avoided.

The choice of which beam to transmit on is up to UE 102 implementation.

When there are no remaining beams 310-313, the UE 102 reports RA problem to upper layers Note that for this rule, the power is ramped individually on each beam. A respective counter is implemented for each beam (cf. FIG. 12, were the counters 762 are maintained for all beams 311-313).

Rule Set 7

UE 102 selects a set of beams 310-313 for PRACH transmission.
  when the BS 101 configures a maximum number of beams 310-313 for beam switching, 'N', the selected set of beams 310-313 is the set of 'N' best beams 310-313

UE 102 initialises a parameter $P_{N\_ramp}$ to zero.

UE 102 initialises the transmission power level to $P_0$, based on the beam with the minimum path loss.

When the UE 102 switches beam, the maximum number of switches it performs before increasing the PRACH transmit power is the number of beams 310-313

When the UE 102 ramps power, it increases $P_{N\_ramp}$.

If $P_{N\_ramp}$ exceeds the maximum number of power ramps, the UE 102 reports RA problem to upper layers Note that in this rule, the transmission power level is ramped globally: once the transmission power level is increased on one of the beams 310-313, that increases power is the transmission power level that would be applied to all other beams 310-313. A global counter is implemented (cf. FIG. 11 where a single counter 762 is maintained for all beams).

Rule Set 8

The UE 102 never transmits the same beam with the same transmission power level; duplicates are avoided.

A beam is still valid for power ramping if:
  The maximum number of transmission power level steps (ramps), 'P', is not exceeded.
  The maximum transmission power level is not exceeded
  There is a maximum number of beams 310-313, 'N', that the UE 102 can use UE 102 reports RA problem to upper layers if there are no more valid beams 310-313 among the 'N' beams 310-313

In the above rule sets, when the rule states that the UE 102 transmit power is increased, it is also within the scope of the rule set that the UE 102 transmission power level is set to min(max UE 102 transmit power, calculated power based on power stepping procedure).

Rule Set 9

Configure the maximum number of beam switching, N, for power ramping in RA Msg.1 6001 (re)transmission, where, UE groups the available beams 310-313 into K beam groups Each beam group has a maximum number of power ramping $P_G(k)$ (k=0, ..., K)

The group is formed based on its probability of successful RA procedure, e.g. based on an estimate of the quality of the beam—that may be obtained from channel measurements Start with the most probable group,
  The UE transmits using the first beam in that group at $P_0$
  If it fails it switched to the next beam
  When all beams 310-313 in the group has been attempted it increase its power by a step size and reset the beam switch
  When the power ramp reaches $P_{G(k)}$ or max power is reached, it will then repeat the step for the next most probably group Summarizing, above techniques have been described in which at least one retransmission parameter of a RA message 1 is provided by the network, e.g., the BS.

Here, the at least one retransmission parameter may be associated with a plurality beams used by the UE for transmitting a plurality of retransmissions of the RA message 1: e.g., the at least one retransmission parameter may be associated with a respective threshold count of beams for transmitting retransmissions of the the RA message 1. Alternatively, or additionally, the at least on retransmission parameter may be associated with a plurality of transmission power levels used by the UE for transmitting a plurality of retransmissions of the RA message 1: e.g., the at least one retransmission parameter may be associated with a respective threshold count of transmission power levels for transmitting retransmissions of the RA message 1.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, above various techniques have been described in which the retransmission strategy implemented by the UE is remote controlled by the network by means of a DL control message which is indicative of at least on retransmission parameter. In other examples, it would also be possible that the at least one retransmission parameter is fixedly configured at the UE; e.g., multiple retransmission parameters may be fixedly configured which are associated with different access services classes. In such cases and in further examples it may not be required to transmit the control message.

For further illustration, above various techniques have been described in which the retransmission strategy implemented by the UE is remote controlled by the network by means of a DL control message which is indicative of at least one retransmission parameter. In various examples, the at least one retransmission parameter is associated with a plurality of beams. Hence, the plurality of beams used for transmitting RA message 1 including a RA preamble is selected in accordance with the at least one retransmission parameter. Alternatively or additionally to using at least one retransmission parameter which is associated with a plurality of beams, it would be possible to use at least one retransmission parameter which is associated with a plurality of transmission power levels. Hence, it would be possible that a plurality of transmission power levels for transmitting the RA message 1 is selected in accordance with the at least one retransmission parameter.

For further illustration, above various techniques have been described in which the at least one retransmission parameter includes upper threshold counts, e.g., associated with power ramping and/or beam switching and/or the overall count of retransmissions. Alternatively or additionally to such scenarios, it would also be possible that the at least one retransmission parameter includes lower threshold counts, e.g., associated with power ramping and/or beam switching and/or the overall count of retransmissions. Thereby, it would be possible that premature truncation of the RA procedure by the UE is avoided.

For still further illustration, above, various techniques have been described in which the at least one retransmission parameter includes threshold counts, e.g., associated with power ramping and/or beam switching and/or the overall count of retransmissions. However, generally, it is not required that the at least one retransmission parameter includes threshold counts. For example, it would also be possible that the at least one retransmission parameter includes more specific definitions with respect to the retransmission strategy. For example, the at least one retransmission parameter may include at least one indicator which is indicative of a plurality of candidate beams. Then, the UE may select the plurality of beams used for transmitting the plurality of retransmissions of the RA message 1 from the plurality of candidate beams. Alternatively or additionally, the at least one retransmission parameter may include at least one indicator which is indicative of a plurality of candidate transmission power levels. Then, the UE may select the plurality of transmission power levels used for transmitting the plurality of retransmissions of the RA message 1 from the plurality of candidate transmission power levels. In further examples, it would even be possible that the at least one retransmission parameter includes at least one indicator which is indicative of the plurality of beams to be used for transmitting the plurality of retransmissions and/or which is indicative of the plurality of transmission power levels to be used for transmitting the plurality of retransmissions. In such a scenario, the UE may select the particular sequence of beams and/or the sequence of transmission power levels for locally defining the retransmission strategy.

For still further illustration, above various techniques have been described in the context of 3GPP NR. Similar techniques may be readily employed for other transmission protocols.

For still further illustration, above various examples have been explained in connection with a plurality of retransmission of RA message 1. Similar techniques may be readily implemented with respect to retransmissions of other RA messages.

In some examples it would even be possible to employ the techniques described herein with respect to other contention-based procedures for accessing shared spectra. Such a scenario may be encountered in unlicensed or open spectra. Here, any message that may be subject to collision could be retransmitted according to the techniques described herein.

The invention claimed is:

1. A method of operating a communication device, comprising:
    receiving, from an associated base station of an associated wireless network, a control message indicative of at least one retransmission parameter for a random access message that comprises a random access preamble; and
    transmitting, on a plurality of beams selected in accordance with the at least one retransmission parameter, a plurality of retransmissions of the random access message,
    wherein transmitting of a successive one of the plurality of retransmissions is conditional on an unsuccessful reception of a preceding one of the plurality of retransmissions,
    wherein the plurality of retransmissions of the random access message are transmitted at a plurality of transmission power levels, wherein the plurality of transmission power levels are selected based on a quantity of the plurality of beams,
    wherein at least one of the quantity of the plurality of transmission power levels or a step size of the plurality of transmission power levels is determined based on the quantity of the plurality of beams.

2. The method of claim 1, wherein:
    the at least one retransmission parameter comprises a threshold count of beams for transmitting the plurality of retransmissions of the random access message; and
    the plurality of retransmissions of the random access message are transmitted on the plurality of beams selected in accordance with the threshold count of beams.

3. The method of claim 2, wherein the threshold count of beams is associated with a count of a contiguous series of beams used for transmitting the plurality of retransmissions of the random access message at the same transmission power level.

4. The method of claim 1, further comprising:
    upon transmitting the preceding one of the plurality of retransmissions, checking whether the preceding one of the plurality of retransmissions has been successfully received; and
    aborting said transmitting of the plurality of retransmissions if the preceding one of the plurality of retransmissions has been successfully received.

5. The method of claim 4, wherein said checking comprises checking whether a response to the preceding one of the plurality of retransmissions is received from the associated base station within a predefined time window from transmitting the preceding one of the plurality of retransmissions.

6. The method of claim 1, wherein:
    the plurality of beams are allocated to a plurality of beam groups; and
    the plurality of retransmissions of the random access message are transmitted by iteratively switching through the plurality of beam groups.

7. The method of claim 1, wherein:
    the at least one retransmission parameter comprises a threshold count of the plurality of retransmissions; and
    the plurality of retransmissions of the random access message are transmitted in accordance with the threshold count of the plurality of retransmissions.

8. The method of claim 7, wherein:
    the threshold count of the plurality of retransmissions is associated with a total count of all retransmissions of the random access message at a random access resource.

9. The method of claim 8, further comprising:
    when a threshold count of all retransmissions of the random access message is reached, implementing a random back-off time duration and re-setting a retransmission counter monitoring the count of the plurality of retransmissions.

10. The method of claim 7, further comprising:
    for the plurality of beams, implementing a global retransmission counter based on the threshold count of the plurality of retransmission.

11. The method of claim 7, further comprising:
for each beam of the plurality of beams, implementing a respective retransmission counter based on the threshold count of the plurality of retransmissions.

12. The method of claim 1, wherein:
the at least one retransmission parameter further comprises a threshold count of power levels; and
the plurality of retransmissions of the random access message are transmitted at the plurality of transmission power levels selected in accordance with the threshold count of power levels.

13. The method of claim 12, wherein:
the threshold count of power levels is associated with a count of a contiguous series of transmission power levels for retransmissions of the random access message on a same beam of the plurality of beams.

14. The method of claim 1, further comprising:
selecting the plurality of beams in accordance with the at least one retransmission parameter; and
selecting the plurality of transmission power levels based on the quantity of the plurality of beams.

15. The method of claim 1, further comprising:
selecting the plurality of transmission power levels based on channel measurements.

16. The method of claim 1, further comprising:
avoiding duplicate retransmissions of the random access message at the same transmission power level and on the same beam.

17. The method of claim 1, wherein the at least one retransmission parameter is associated with an access service class.

18. A method of operating a base station of an associated wireless network, comprising:
transmitting, to an associated communication device, a control message indicative of at least one retransmission parameter for a random access message that comprises a random access preamble, the at least one retransmission parameter being associated with a plurality of beams; and
receiving, from the associated communication device on the plurality of beams, a plurality of retransmissions of the random access message,
wherein the plurality of retransmissions of the random access message are received at a plurality of transmission power levels, wherein the plurality of transmission power levels are selected by the associated communication device based on a quantity of the plurality of beams,
wherein at least one of the quantity of the plurality of transmission power levels or a step size of the plurality of transmission power levels is determined based on the quantity of the plurality of beams.

19. The method of claim 18, further comprising:
determining the at least one retransmission parameter based on a traffic load at the base station.

* * * * *